(12) United States Patent
Nakanishi et al.

(10) Patent No.: US 11,346,520 B2
(45) Date of Patent: May 31, 2022

(54) ROTATING REFLECTOR, OPTICAL UNIT, SUPPORT COMPONENT, VEHICLE HEADLAMP SYSTEM, METHOD OF MANUFACTURING ROTATING REFLECTOR

(71) Applicant: KOITO MANUFACTURING CO., LTD., Tokyo (JP)

(72) Inventors: Yoshiyuki Nakanishi, Shizuoka (JP); Teppei Muramatsu, Shizuoka (JP); Hidetada Tanaka, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/232,390

(22) Filed: Apr. 16, 2021

(65) Prior Publication Data

US 2021/0231286 A1 Jul. 29, 2021

Related U.S. Application Data

(63) Continuation of application No. PCT/JP2019/040693, filed on Oct. 16, 2019.

(30) Foreign Application Priority Data

Oct. 19, 2018 (JP) .............................. JP2018-197811
Oct. 19, 2018 (JP) .............................. JP2018-197812

(Continued)

(51) Int. Cl.
*F21S 41/675* (2018.01)
*F21S 41/25* (2018.01)
(Continued)

(52) U.S. Cl.
CPC ........ *F21S 41/675* (2018.01); *B29C 45/2708* (2013.01); *F21S 41/148* (2018.01);
(Continued)

(58) Field of Classification Search
None
See application file for complete search history.

(56) References Cited

U.S. PATENT DOCUMENTS

2010/0214538 A1 8/2010 Fukunaga et al.
2014/0313755 A1* 10/2014 Tanaka ................... F21S 41/16
362/514

(Continued)

FOREIGN PATENT DOCUMENTS

EP 2559935 A1 2/2013
JP 2009-092997 A 4/2009
(Continued)

OTHER PUBLICATIONS

International Preliminary Report on Patentability (Form PCT/IB/373) and the Written Opinion of the International Searching Authority (Form PCT/ISA/237) dated Apr. 14, 2021, in the corresponding International Application No. PCT/JP2019/040693. (22 pages).

(Continued)

*Primary Examiner* — Elmito Breval
(74) *Attorney, Agent, or Firm* — Buchanan Ingersoll & Rooney PC

(57) ABSTRACT

A rotating reflector is a resin rotating reflector including: a rotating part; and a blade provided around the rotating part (Continued)

and functioning as a reflecting surface, wherein the rotating part has a hole in which a rotary shaft is inserted.

17 Claims, 34 Drawing Sheets

(30) Foreign Application Priority Data

| Oct. 19, 2018 | (JP) | JP2018-197813 |
|---|---|---|
| Oct. 19, 2018 | (JP) | JP2018-197814 |
| Oct. 19, 2018 | (JP) | JP2018-197815 |
| Oct. 19, 2018 | (JP) | JP2018-197816 |
| Oct. 19, 2018 | (JP) | JP2018-197819 |

(51) Int. Cl.
*F21S 41/663* (2018.01)
*F21S 41/148* (2018.01)
*F21S 41/39* (2018.01)
*B29C 45/27* (2006.01)
*G02B 26/12* (2006.01)
*F21Y 115/10* (2016.01)
*B29K 69/00* (2006.01)
*B29L 11/00* (2006.01)

(52) U.S. Cl.
CPC .............. *F21S 41/25* (2018.01); *F21S 41/39* (2018.01); *F21S 41/663* (2018.01); *G02B 26/125* (2013.01); *B29K 2069/00* (2013.01); *B29L 2011/0083* (2013.01); *F21Y 2115/10* (2016.08)

(56) References Cited

U.S. PATENT DOCUMENTS

| 2014/0313762 | A1 | 10/2014 | Owada |
| 2016/0341390 | A1 | 11/2016 | Yamamura et al. |
| 2017/0185855 | A1 | 6/2017 | Yamamura et al. |
| 2018/0106447 | A1 | 4/2018 | Tanaka et al. |
| 2018/0128443 | A1 | 5/2018 | Taudt et al. |
| 2018/0209606 | A1 | 7/2018 | Nakano et al. |
| 2018/0335192 | A1* | 11/2018 | Tanaka ................. F21S 41/153 |
| 2020/0149702 | A1 | 5/2020 | Takii et al. |

FOREIGN PATENT DOCUMENTS

| JP | 2013-089503 A | 5/2013 |
| JP | 2014-164876 A | 9/2014 |
| JP | 2015-090853 A | 5/2015 |
| JP | 2017-037806 A | 2/2017 |
| JP | 2018-067523 A | 4/2018 |
| JP | 2018-520483 A | 7/2018 |
| WO | 2011/129105 A1 | 10/2011 |
| WO | 2015/122303 A1 | 8/2015 |
| WO | 2018/235691 A1 | 12/2018 |

OTHER PUBLICATIONS

International Search Report (Form PCT/ISA/210) dated Dec. 17, 2019, in corresponding International Application No. PCT/JP2019/040693. (4 pages).

Extended European Search Report dated Nov. 11, 2021, issued in corresponding European Application No. 19874612.5. (9 pages).

* cited by examiner

140

ROTATING REFLECTOR, OPTICAL UNIT, SUPPORT COMPONENT, VEHICLE HEADLAMP SYSTEM, METHOD OF MANUFACTURING ROTATING REFLECTOR

BACKGROUND OF THE INVENTION

1. Technical Field

The present invention relates to a component of an optical unit and, for example, to a rotating reflector rotated around a rotational axis while reflecting light emitted from a light source and to a lens unit. Further, the present invention relates to a component of an optical unit used in a vehicle headlamp and, for example, to an optical member having an optical controller for controlling light emitted from a light source. Still further, the present invention relates to a linking structure for linking connectors and, for example, to a linking structure for linking connectors for feeding power to a light source. Still further, the present invention relates to a support component for supporting the rotating reflector. Still further, the present invention relates to a method of manufacturing the optical unit. Still further, the present invention relates to a vehicle headlamp system including the optical unit.

2. Description of the Related Art (1) In the related art, an optical unit that includes a rotating reflector rotated in one direction around a rotational axis while reflecting light emitted from a light source is proposed (see patent document 1). The rotating reflector including the optical unit is provided with a reflecting surface so that the light of the light source reflected during rotation forms a desired light distribution pattern.

(2) Apparatuses for forming a desired light distribution pattern by reflecting light emitted from a light source forward with respect to a vehicle to scan an area in front of the vehicle with the reflected light are devised recently. For example, there is known an optical unit including: a rotating reflector rotated in one direction around a rotational axis while reflecting light emitted from a light source; and a light source comprised of a light emitting device, wherein the rotating reflector is provided with a reflecting surface so that the light of the light source reflected during rotation forms a desired light distribution pattern (see patent document 2, patent document 5).

The optical unit includes: a first light source; a second light source; a rotating reflector rotated around a rotational axis while reflecting first light emitted from the first light source; and a projection lens for projecting the first light reflected by the rotating reflector in a direction of light irradiation of the optical unit. The second light source is arranged such that the emitted second light is incident on the projection lens without being reflected by the rotating reflector, and the projection lens projects the second light in the direction light irradiation.

(3) In the related art, a vehicle headlamp in which a light guiding element is provided between a light source and a condensing lens in order to condense light emitted from the light source toward a projection lens is devised (see patent document 3).

(4) In the related art, a lamp unit mounted on a vehicle, etc., in which a connector is mounted on a substrate on which the light source is mounted, is devised, the connector being connected to a feed cable for feeding power to a light source (see patent document 4).

(5) (6) The aforementioned optical unit is configured such that the rotational axis of the rotating reflector is at an angle to the light axis of the projection lens to reflect the light emitted from the light source at an angle and guiding it toward the projection lens.

Patent document 1: WO11/129105
Patent document 2: JP2018-67523
Patent document 3: JP2018-520483
Patent document 4: JP2017-37806
Patent document 5: WO15/122303

(1) The aforementioned rotating reflector can be manufactured by various methods. For example, it is possible to manufacture the rotating reflector by injection molding that uses a mold. When the rotating reflector is manufactured by injection molding that uses a mold, however, a burr may remain when the rotating reflector is released from the gate. The burr disrupts the rotational balance of a rotating body and, in particular, a rotating body like the rotating reflector. Further, when a burr is located on the outer circumference of the rotating reflector, inertia (moment of inertia) will be increased, affecting the rotational accuracy of the rotating reflector.

(2) The aforementioned optical unit includes, apart from the projection lens, a diffusion lens for changing the light path of the second light emitted from second light source and guiding it toward the projection lens.

(3) When the light emitted from the light source is incident on an area outside the optical controller of the optical member, the light may be output in an unintended direction, causing unnecessary light such as a glare.

(4) The connector mounted on the substrate is connected to another connector connected to the feed cable. If the connection is insufficient, the lighted state of the light source may be unstable, or the connectors may be disconnected.

(5) To fit the aforementioned rotating reflector to another member, it is necessary to fit the rotating reflector via a case that rotatably supports the rotating reflector. Further, if the direction of fixing the case is aligned with the rotational axis of the rotating reflector, it will be necessary to further provide a fixing part on the outer circumferential part of the case, which is larger than the diameter of the rotating reflector.

(6) The aforementioned optical unit is manufactured by assembling a plurality of components. Depending on the sequence of assembling components or the direction of assembly, the assembling steps may become complicated with the result that the efficiency of assembly is degraded, or the workload on the operator performing the assembly may be increased.

(7) When the aforementioned optical unit is used as a vehicle headlamp, a pair of left and right optical units will normally be necessary. If the layouts of main components of the optical unit are not symmetrical with respect to a vertical cross section including the longitudinal direction of the vehicle, therefore, it would be difficult to use a completely common unit for the left and right optical units.

SUMMARY OF THE INVENTION

The present invention addresses the above-described issue, and (1) an illustrative purpose thereof is to provide a novel technology for realizing a rotating reflector having a high rotational accuracy.

(2) Another illustrative purpose is to provide a novel holder for holding a plurality of lenses.

(3) Another illustrative purpose is to provide a novel technology for inhibiting occurrence of an unintended glare.

(4) Another illustrative purpose is to provide a novel technology for improving the connection reliability of the connectors.

(5) Another illustrative purpose is to provide a technology of saving the space required for the support component for rotatably supporting the rotating reflector.

(6) Another illustrative purpose is to provide a method of manufacturing an optical unit for which it is relatively easy to assemble components.

(7) Another illustrative purpose is to provide a technology for making it possible to use common components to form the optical unit.

(1) A method of manufacturing a rotating reflector according to an embodiment of the present invention is a method of manufacturing a rotating reflector including a rotating part and a blade provided around the rotating part and functioning as a reflecting surface, the method comprising: performing injection molding by using a mold in which a gate is formed more toward the rotating part than a cavity part corresponding to the blade.

Another embodiment of the present invention relates to a rotating reflector. The rotating reflector is a resin rotating reflector including: a rotating part; and a blade provided around the rotating part and functioning as a reflecting surface, wherein the rotating part has a hole in which a rotary shaft is inserted. A plurality of traces of gates are formed between the hole and the blade, and welds, in which molten resin injected from a plurality of gates converge, are formed around the hole and in the neighborhood of the traces of gates.

(2) A lens unit according to an embodiment of the present invention includes: a first lens provided on an emission side; a second lens provided on an incidence side; and a holder that holds the first lens and the second lens. The first lens overlaps the second lens in part as viewed from the emission side.

(3) An optical member according to an embodiment of the present invention includes: an optical controller that controls light incident from a back side and outputs the light from a front side; and a base part adjacent to the optical controller. The optical controller has a plurality of lens parts respectively corresponding to light emitted from a plurality of light emitting devices. The base part has a scattering part that scatters at least a portion of the light incident from the back side or the light output from the front side.

(4) A linking structure according to an embodiment of the present invention includes: a heat sink; a circuit substrate mounted on the heat sink and formed with a power feeding channel for a light source; a first connector fixed on the circuit substrate; and a guide part that guides a second connector toward the first connector when the second connector on the side of a code is connected to the first connector. The guide part is configured such that a part of the second connector enters an area between the guide part and the first connector.

(5) A support component according to an embodiment includes: a support part that rotatably supports a rotating reflector for reflecting light emitted from a light source; and fixing parts fixed to fixed parts integrated with a mounting component on which the light source is mounted. The fixing parts have positioning surfaces positioned with respect to the fixed parts. The positioning surfaces are formed to be at an angle to a rotational axis of the rotating reflector.

(6) A method of manufacturing an optical unit according to an embodiment of the present invention is a method of manufacturing an optical unit including: a light source; a mounting component on which the light source is mounted; a rotating reflector that reflects light emitted from the light source; a support component that rotatably supports the rotating reflector; a projection lens that projects reflected light reflected by the rotating reflector forward; and a lens holder that holds the projection lens. The method includes: mounting the light source on the mounting component; after the mounting, fixing the lens holder supporting the projection lens to the mounting component; and, after the fixing of the lens holder, fixing the support component supporting the rotating reflector to the mounting component.

(7) A vehicle headlamp system according to an embodiment of the present invention includes: a first optical unit provided front right in a vehicle; and a second optical unit provided front left in a vehicle. The first optical unit includes: a first light source; a first rotating reflector rotated around a rotational axis while reflecting light emitted from the first light source; and a first motor that rotates the first rotating reflector in a predetermined one direction. The second optical includes: a second light source; a second rotating reflector rotated around a rotational axis while reflecting light emitted from the second light source; and a second motor that rotates the second rotating reflector in the same predetermined one direction as a direction of rotation of the first rotating reflector. The first rotating reflector has a first reflecting surface configured to form a desired light distribution pattern by causing the light of the first light source reflected during rotation to scan an area in front of the vehicle. The second rotating reflector has a second reflecting surface configured to form a desired light distribution pattern by causing the light of the second light source reflected during rotation to scan an area in front of the vehicle. The first reflecting surface and the second reflecting surface are arranged to be horizontally symmetrical with respect to the center of the vehicle, and surface shapes of the first and second reflecting surfaces are mirror images of one another.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

Figure 1:
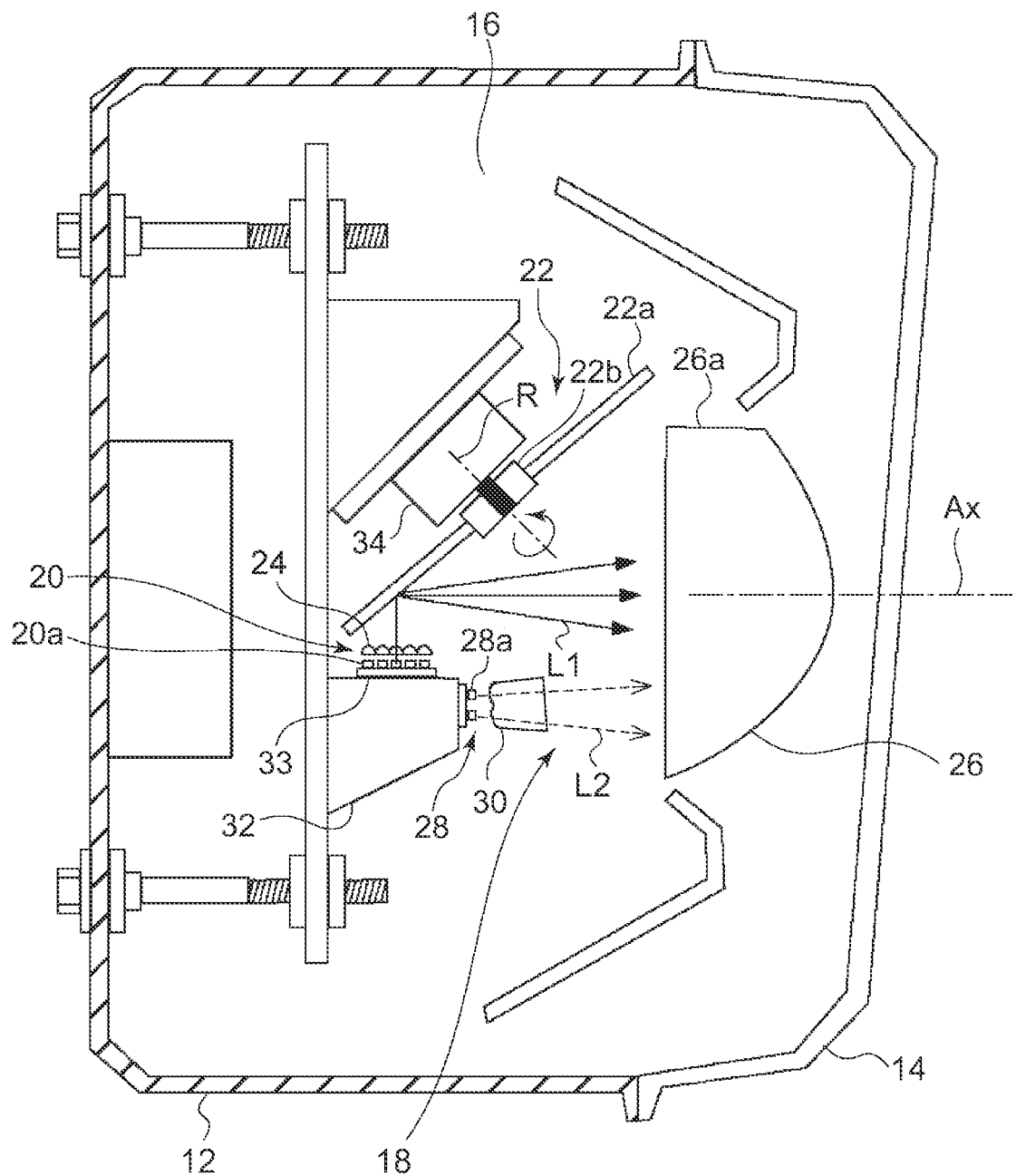
FIG. 1 is a schematic horizontal cross-sectional view of the vehicle headlamp according to the embodiment.

DETAILED DESCRIPTION OF THE INVENTION (1) A method of manufacturing a rotating reflector according to an embodiment of the present invention is a method of manufacturing a rotating reflector including a rotating part and a blade provided around the rotating part and functioning as a reflecting surface, the method comprising: performing injection molding by using a mold in which a gate is formed more toward the rotating part than a cavity part corresponding to the blade.

Therefore, even if a burr remains when the rotating reflector is released from the gate of the mold after injection molding, the is produced on the side of the rotating part (toward the center9 of the rotating reflector. Thus, in comparison with a case in which a burr is produced on the outer circumferential surface of the blade of the rotating reflector, the inertia produced when the reflector is rotated is decreased, and degradation in rotational balance of the reflector is reduced. Therefore, the impact (eccentricity and vibration) on rotation accuracy is suppressed.

The gate may be provided on the same side as the reflecting surface of the blade. The extrusion pin used to extrude and remove the rotating reflector from the mold affects light reflection if the track of extrusion remains on the reflecting surface of the blade. To address this, the extrusion pin is provided to push a surface opposite to the reflecting surface of the blade because light reflection is not affected that way. When the extrusion pin is provided in this way and when the gate is provided on the side opposite to the reflecting surface of the blade, both the gate and the extrusion pin will have to be provided in the mold opposite to the reflecting surface of the blade, making the structure and combination of the mold 106 complicated. However, the aforementioned problem is resolved according to the embodiment by providing the gate in the mold 102 (cavity mold) on the fixed side and providing the extrusion pin in the mold (core mold) on the movable side.

The gate may be formed at a position that faces the rotating part. This ensures that, even if a burr is produced, the burr is formed in the rotating part so that degradation in rotational balance of the rotating reflector is reduced.

The number of gates formed may be the same as the number of blades. This ensures that molten resin is evenly injected for molding from the respective gates to the cavity parts corresponding to the respective blades.

A mounting part which forms a part of the rotating part and on which is mounted a non-resin component, in which a rotary shaft is inserted, is formed in the neighborhood of the gate of the mold. The increases the bonding strength of the resin part and the non-resin part during insertion molding because the molten resin injected from the gate is solidified as it comes into contact with the non-resin component at a relatively high temperature in the initial stage of molding.

Another embodiment of the present invention relates to a rotating reflector. The rotating reflector is a resin rotating reflector including: a rotating part; and a blade provided around the rotating part and functioning as a reflecting surface, wherein the rotating part has a hole in which a rotary shaft is inserted. A plurality of traces of gates are formed between the hole and the blade, and welds, in which molten resin injected from a plurality of gates converge, are formed around the hole and in the neighborhood of the traces of gates.

According to the embodiment, the molten resin injected from the plurality of gates converge at a relative high temperature in the initial stage of molding to form the welds around the hole and in the neighborhood of the traces of gates. Therefore, improper adhesion and poor mechanical strength in the welds are prevented.

(2) A lens unit according to an embodiment of the present invention includes: a first lens provided on an emission side; a second lens provided on an incidence side; and a holder that holds the first lens and the second lens. The first lens overlaps the second lens in part as viewed from the emission side.

This causes the first lens and the second lens to be held by the holder such that they overlap as viewed from the emission side and so realizes a compact size of the lens unit.

The holder may include: a first mounting part on which the first lens is mounted; and a second mounting part on which the second lens is mounted. The first mounting part may be formed more toward the emission side than the second mounting part. In this way, the first lens can be provided on the emission side.

The holder may be a cylindrical member that transmits light inside, and the first mounting part and the second mounting part may be formed on one end surface of the holder. This allows the first lens and the diffusion lens to be assembled in the holder from the same direction.

The first lens may include: a first area that transmits light emitted from a first light source; and a second area that transmits light emitted from a second light source and transmitted by the second lens. This allows the light transmitted through the second lens to be further controlled by the first lens.

Another embodiment of the present invention relates to an optical unit. The optical unit includes: a first light source; a second light source; a lens unit; and a rotating reflector that reflects light emitted from the first light source toward the first area with a rotating reflecting surface.

(3) An optical member according to an embodiment of the present invention includes: an optical controller that controls light incident from a back side and outputs the light from a front side; and a base part adjacent to the optical controller. The optical controller has a plurality of lens parts respectively corresponding to light emitted from a plurality of light emitting devices. The base part has a scattering part that scatters at least a portion of the light incident from the back side or the light output from the front side.

The embodiment makes it possible to scatter, of the light emitted from the light emitting device, the light incident on the base part outside the optical controller without being incident on the optical controller. This suppresses occurrence of glare due to the light transmitted through the base part.

A surface of the scattering part may have an arithmetic mean roughness of 0.3 µm or larger.

The lens parts may be shaped to condense light by refracting transmitted light.

The optical member may be an injection molded product entirely made of silicone. This makes it possible to manufacture an optical member having a shape with a certain complexity, by using a simple configuration.

The base part may be plate-shaped and have thick parts having a thickness larger than a thickness around the optical controller. The thick parts may be formed in a periphery of the base part. This suppresses warp of the optical member itself.

Another embodiment of the present invention relates to a vehicle lamp. The vehicle headlamp may include: a light source having a plurality of light emitting devices; an optical member that controls light distribution of light emitted respectively from the plurality of light emitting devices; and a projection lens that projects the light for which light distribution is controlled by the optical member forward with respect to a vehicle.

This suppresses occurrence of glare to pedestrians located in front of the vehicle or passengers of the vehicle.

(4) A linking structure according to an embodiment of the present invention includes: a heat sink; a circuit substrate mounted on the heat sink and formed with a power feeding channel for a light source; a first connector fixed on the circuit substrate; and a guide part that guides a second connector toward the first connector when the second connector on the side of a code is connected to the first connector. The guide part is configured such that a part of the second connector enters an area between the guide part and the first connector.

According to the embodiment, the guide part improves workability when the second connector is connected to the first connector reduces connection failure. Further, entry of a part of the second connector into an area between the guide part and the first connector makes it difficult for the second connector to be removed from the first connector.

The guide part may be formed with guide grooves that guide the part of the second connector in a warped state when the second connector is connected to the first connector. This causes the part of the second connector to be guided by the guide grooves, which makes it possible to warp the part of the second connector without requiring, for example, a human operator to warp the lock part (latch part). It is therefore easy to connect the second connector to the first connector.

The guide part may have an engaging part with which the part of the second connector guided by the guide grooves is engaged while the second connector is fitted in the first connector. This prevents the second connector from being dislodged from the first connector.

The first connector may be arranged such that a connection part faces upward with respect to a substrate surface of the circuit substrate, and the guide part is provided at a position above and distanced from the connection part. Thus, the operator can cause the guide part to guide the second connector toward the first connector while viewing the connection part of the first connector so that workability experienced when the connectors are connected is improved.

The guide part may be fixed to the heat sink. The guide part may be fixed to the heat sink directly or via another member. Alternatively, the guide part may be integrated with the heat sink.

(5) A support component according to an embodiment includes: a support part that rotatably supports a rotating reflector for reflecting light emitted from a light source; and fixing parts fixed to fixed parts integrated with a mounting component on which the light source is mounted. The fixing parts have positioning surfaces positioned with respect to the fixed parts. The positioning surfaces are formed to be at an angle to a rotational axis of the rotating reflector.

This allows at least a part of the fixing parts to be provided inward of the outer edge part of the rotating reflector as viewed in the direction of the rotational axis of the rotating reflector.

The fixing parts may have a first fixing part and a second fixing part. The support part may be provided between the first fixing part and the second fixing part. This arranges the support part and the fixing parts on a straight line so that the parts are arranged with excellent balance with respect to the gravitational center, and the vibration during the rotation of the rotating reflector or the nose, etc. caused by the vibration are reduced.

The support component may further include: a case in which the support part is provided at a center. The fixing parts may be provided in an area on a back side of the case opposite, across the case, to an area where the rotating reflector is located. This allows at least a part of the fixing parts to be provided on the back side of the case as viewed in the direction of the rotational axis of the rotating reflector.

Another embodiment of the present invention relates to an optical unit. The optical unit includes: a light source; a mounting component on which the light source is mounted; the aforementioned support component; a rotating reflector supported by the support component; and a projection lens that projects light reflected by the rotating reflector forward. A rotational axis of the rotating reflector may be at an angle to a light axis of the projection lens. This realizes a compact optical unit.

The mounting component may include: a mounting surface on which the light source is mounted; and a fixed part provided in an area distanced from the mounting surface, the fixing part being fixed to the fixed parts. A reflecting surface of the rotating reflector that reflects light emitted from the light source may be provided between the mounting surface and the fixed part at an angle to the light axis of the projection lens.

(6) A method of manufacturing an optical unit according to an embodiment of the present invention is a method of manufacturing an optical unit including: a light source; a mounting component on which the light source is mounted; a rotating reflector that reflects light emitted from the light source; a support component that rotatably supports the rotating reflector; a projection lens that projects reflected light reflected by the rotating reflector forward; and a lens holder that holds the projection lens. The method includes: mounting the light source on the mounting component; after the mounting, fixing the lens holder supporting the projection lens to the mounting component; and, after the fixing of the lens holder, fixing the support component supporting the rotating reflector to the mounting component.

This fixes the projection lens to the mounting component, on which the light source is mounted, via the lens holder so that it is easy to position the light source and the projection lens. Similarly, the rotating reflector is fixed to the mounting component, on which the light source is mounted, via the support component so that it is easy to position the light source and the rotating reflector. This makes it relatively easy to assemble the components.

A first direction in which the lens holder is fixed to the mounting component and a second fixing direction in which the support component is fixed to the mounting component may be the same. For example, this reduces the frequency at which the orientation of the jig is changed or the operator changes the posture in the first fixing step and the second fixing step.

A direction in which the light source is mounted on the mounting component and the first fixing direction may be the same. This reduces the frequency at which the orientation of the jig is changed or the operator changes the posture in the mounting step and the first fixing step.

The support component may include: a support part that rotatably supports the rotating reflector for reflecting light emitted from a light source; and fixing parts fixed to fixed parts integrated with a mounting component on which the light source is mounted. A rotational axis of the rotating reflector may be at an angle to the second fixing direction. This ensures that the second fixing direction, in which the support component that supports the rotating reflector having the rotational axis at an angle to the light axis of the projection lens is fixed to the mounting component, is the same as the first step direction and the mounting direction.

The fixing parts may have positioning surfaces positioned with respect to the fixed parts. The positioning surfaces may be surfaces intersecting the second fixing direction. This improves the precision of positioning the light source and the rotating reflector.

(7) A vehicle headlamp system according to an embodiment of the present invention includes: a first optical unit provided front right in a vehicle; and a second optical unit provided front left in a vehicle. The first optical unit includes: a first light source; a first rotating reflector rotated around a rotational axis while reflecting light emitted from the first light source; and a first motor that rotates the first rotating reflector in a predetermined one direction. The second optical includes: a second light source; a second rotating reflector rotated around a rotational axis while reflecting light emitted from the second light source; and a second motor that rotates the second rotating reflector in the same predetermined one direction as a direction of rotation of the first rotating reflector. The first rotating reflector has a first reflecting surface configured to form a desired light distribution pattern by causing the light of the first light source reflected during rotation to scan an area in front of the vehicle. The second rotating reflector has a second reflecting surface configured to form a desired light distribution pattern by causing the light of the second light source reflected during rotation to scan an area in front of the vehicle. The first reflecting surface and the second reflecting surface are arranged to be horizontally symmetrical with respect to the center of the vehicle, and surface shapes of the first and second reflecting surfaces are mirror images of one another.

According to the embodiment, the directions of rotation of the first rotating reflector and the second rotating reflector are the same so that a common unit may be used for the first motor and the second motor.

The first optical unit may further have a first projection lens that projects the light reflected by the first rotating reflector forward with respect to the vehicle. The second optical unit may further have a second projection lens that projects the light reflected by the second rotating reflector forward with respect to the vehicle. A first optical surface of the first projection lens transmitting the light reflected by the first rotating reflector may be horizontally asymmetrical with respect to a light axis, a second optical surface of the second projection lens transmitting the light reflected by the second rotating reflector may be horizontally asymmetrical with respect to a light axis, and the first optical surface and the second optical surface are related such that surface shapes of the first and second optical surfaces may be mirror images of one another. Since the first optical surface and the second optical surface are related such that the surface shapes thereof are mirror images of one another, the first projection lens is provided front right in the vehicle, and the second projection lens is provided front left in the vehicle, the optical design of the second projection lens may merely be a horizontally inverted version of the optical design of the first projection lens.

The first rotating reflector may have a plurality of first blades as first reflecting surfaces, the second rotating reflector may have a plurality of second blades as second reflecting surfaces, and the vehicle headlamp may further include: a control unit that controls the first light source to be turned on or off so that the light emitted from the first light source is not incident on the plurality of first blades at the same time and controls the second light source to be turned on or off so that the light emitted from the second light source is not incident on the plurality of second blades at the same time. For example, this inhibits the reflected light from the plurality of first blades from scanning locations in front of the vehicle at the same time and inhibits the reflected light from the plurality of second blades from scanning locations in front of the vehicle at the same time, by turning off the first light source and the second light source at predetermined points of time.

A through hole may be formed between the adjacent first blades of the first rotating reflector so that the light emitted from the first light source is not incident on the plurality of first blades at the same time. A through hole may be formed between the adjacent second blades of the second rotating reflector so that the light emitted from the second light source is not incident on the plurality of second blades at the same time. This inhibits the reflected light from the plurality of first blades from scanning locations in front of the vehicle at the same time and inhibits the reflected light from the plurality of second blades from scanning locations in front of the vehicle at the same time, without turning off the light sources for a long period of time.

The control unit may shift a point of time when the second light source is turned off with respect to a point of time when the first light source is turned off. The first reflecting surface of the first rotating reflector and the second reflecting surface of the second rotating reflector are rotated in the same direction. Further, the first reflecting surface and the second reflecting surface are arranged to be horizontally symmetrical with respect to the center of the vehicle and are related such that the surface shapes of the reflecting surfaces are mirror images of one another. If the timing for turning off the first light source is aligned with the timing for turning off the second light source, therefore, the light distribution pattern formed by the first optical unit will match the light distribution pattern formed by the second optical unit. Therefore, a horizontally symmetrical pattern can be formed by shifting the timing for turning off the light sources.

A direction in which the light of the first light source reflected by the first rotating reflector during rotation scans an area in front of the vehicle and a direction in which the light of the second light source reflected by the second rotating reflector during rotation scans an area in front of the vehicle may be the same. This forms a light distribution pattern that that the driver does not feel uncomfortable.

Optional combinations of the aforementioned constituting elements, and implementations of the invention in the form of methods, apparatuses, and systems may also be practiced as additional modes of the present invention.

Hereinafter, the invention will be described based on preferred embodiments with reference to the accompanying drawings. Identical or like constituting elements, members, processes shown in the drawings are represented by identical symbols and a duplicate description will be omitted as appropriate. The embodiments do not intend to limit the scope of the invention but exemplify the invention. Not all of the features and the combinations thereof described in the embodiments are necessarily essential to the invention.

First Embodiment

The optical unit having a rotating reflector according to the embodiment can be used in various vehicle headlamps. An overview of the vehicle headlamp in which the optical unit according to the embodiment described later can be mounted will first be given.

(Vehicle Headlamp)

Figure 2:
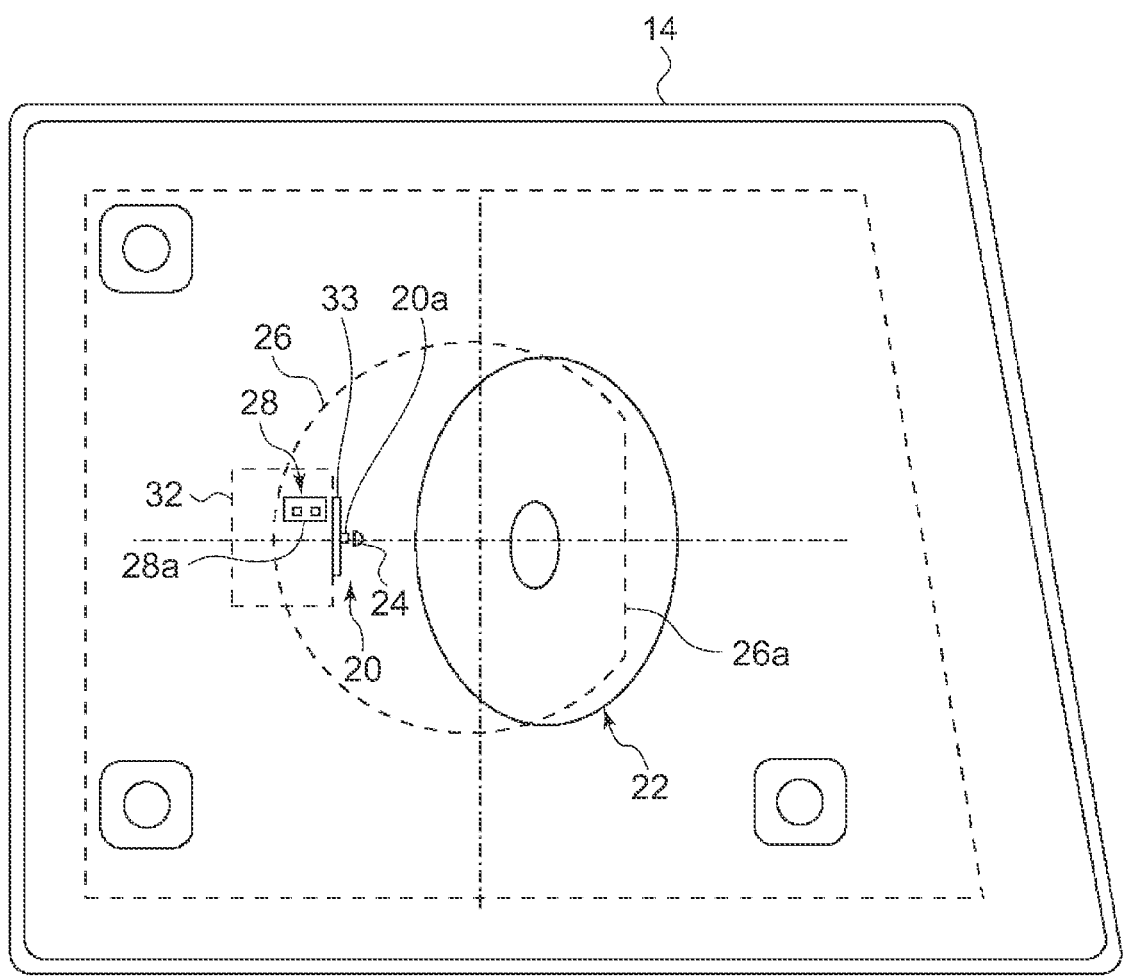
FIG. 2 is a front view of the vehicle headlamp according to the embodiment.

FIG. 1 is a schematic horizontal cross-sectional view of the vehicle headlamp according to the embodiment. FIG. 2 is a front view of the vehicle headlamp according to the embodiment. In FIG. 2, some components are omitted.

A vehicle headlamp 10 according to the embodiment is a right headlamp mounted on the right side of the front end part of an automobile having substantially the same structure as the headlamp mounted on the left side except that the layout of main components and configuration are horizontally symmetrical. Therefore, the vehicle headlamp 10 on the right side will be described in detail below, and a description of the vehicle headlamp on the left side will be omitted as appropriate.

As shown in FIG. 1, the vehicle headlamp 10 includes a lamp body 12 having a recess that opens frontward. The front opening of the lamp body 12 is covered by a transparent front cover 14 to form a lamp chamber 16 The lamp chamber 16 functions as a space that houses one optical unit 18. The optical unit 18 is a lamp unit configured to project a variable high beam. A variable high beam is controlled to change the shape of the high-beam light distribution pattern. For example, a non-irradiated region (shielded portion) can be produced in a portion of the light distribution pattern.

The optical unit 18 according to the embodiment includes: a first light source 20; a condensing lens 24 as a primary optical system (optical member) for changing the light path of a first light L1 emitted from the first light source 20 and guiding it toward a blade 22a of a rotating reflector 22; the rotating reflector 22 rotated around a rotational axis R while reflecting the first light L1; a convex lens 26 as a projection lens for projecting the first light L1 reflected by the rotating reflector 22 in a direction of light irradiation (rightward in FIG. 1); a second light source 28 provided between the first light source 20 and the convex lens 26; a diffusion lens 30 as a primary optical system (optical member) for changing the light path of a second light L2 emitted from the second light source 28 and guiding it toward the convex lens 26; and a heat sink 32 on which the first light source 20 and the second light source 28 are mounted.

A semiconductor light emitting device such as LED, EL, LD is used in each light source. The first light source 20 according to the embodiment is comprised of an array of a plurality of LEDs 20a on a circuit substrate 33. The LEDs 20a are configured such that they can be turned on or off individually.

The second light source 28 according to the embodiment is comprised of a horizontal array of two LEDs 28a, and the LEDs 28a are configured such that they can be turned on or off individually. Further, the second light source 28 is arranged such that the second light L2 is incident on the convex lens 26 without being reflected by the rotating reflector 22. In this way, the optical characteristic of the second light L2 emitted from the second light source 28 can be selected without considering the reflection by the rotating reflector 22. Because it is possible to irradiate a wider range by causing the light emitted from the second light source 28 to be diffused by the diffusion lens 30 before being incident on the convex lens 26. Therefore, the second light source 28 can be used as a light source for irradiating a region distanced from the vehicle.

The rotating reflector 22 is rotated by a drive source such as a motor 34 in one direction around the rotational axis R. In the rotating reflector 22, two blades 22a having the same shape are provided around a cylindrical rotating part 22b. The blade 22a functions as a reflecting surface rotated to scan an area in front with the light emitted from the first light source 20 to form a desired light distribution pattern.

The rotational axis R of the rotating reflector 22 is at an angle to an light axis Ax and is provided in a plane that includes the light axis Ax and the first light source 20. Stated otherwise, the rotational axis R is provided substantially parallel to the scanning plane of the light (irradiating beam) of the LED 20a scanning horizontally during rotation. This can reduce the thickness of the optical unit. The scanning plane can be defined as a sectoral plane formed by continuously connecting the track of light of the LED 20a that is a scanning light.

The shape of the convex lens 26 may be selected as appropriate in accordance with the required light distribution pattern or light distribution characteristic such as illumination distribution. An aspherical surface lens or a free-form curved surface lens may be used. For example, it is possible to form a notch 26a produced by cutting out a part of the outer circumference in the vertical direction, by arranging the light sources and the rotating reflector 22 suitably. It is therefore possible to control the size of the optical unit 18 in the direction of vehicle width.

The presence of the notch 26a inhibits the blade 22a of the rotating reflector 22 from interfering with the convex lens 26 and makes it possible to bring the convex lens 26 and the rotating reflector 22 closer. Further, because a non-circular (linear) portion is formed in the outer circumference of the convex lens 26 when the vehicle headlamp 10 is viewed from the front, it is possible to realize a vehicle headlamp of a novel design having a lens of an outer form in which a curve and a straight are combined as viewed from the front of the vehicle.

(Rotating Reflector)

Figure 3:
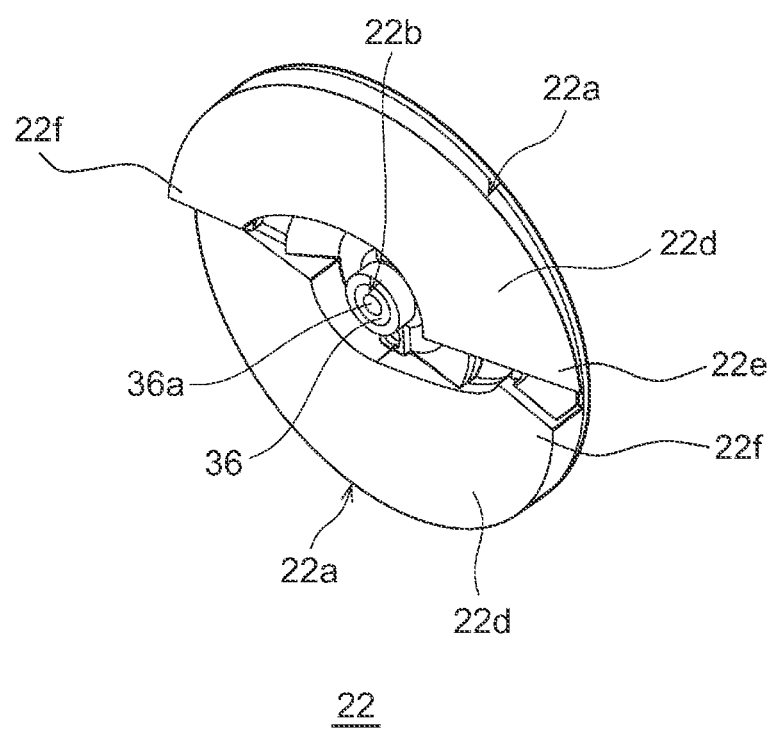
FIG. 3 is a perspective view of the rotating reflector according to the embodiment.
Figure 4:
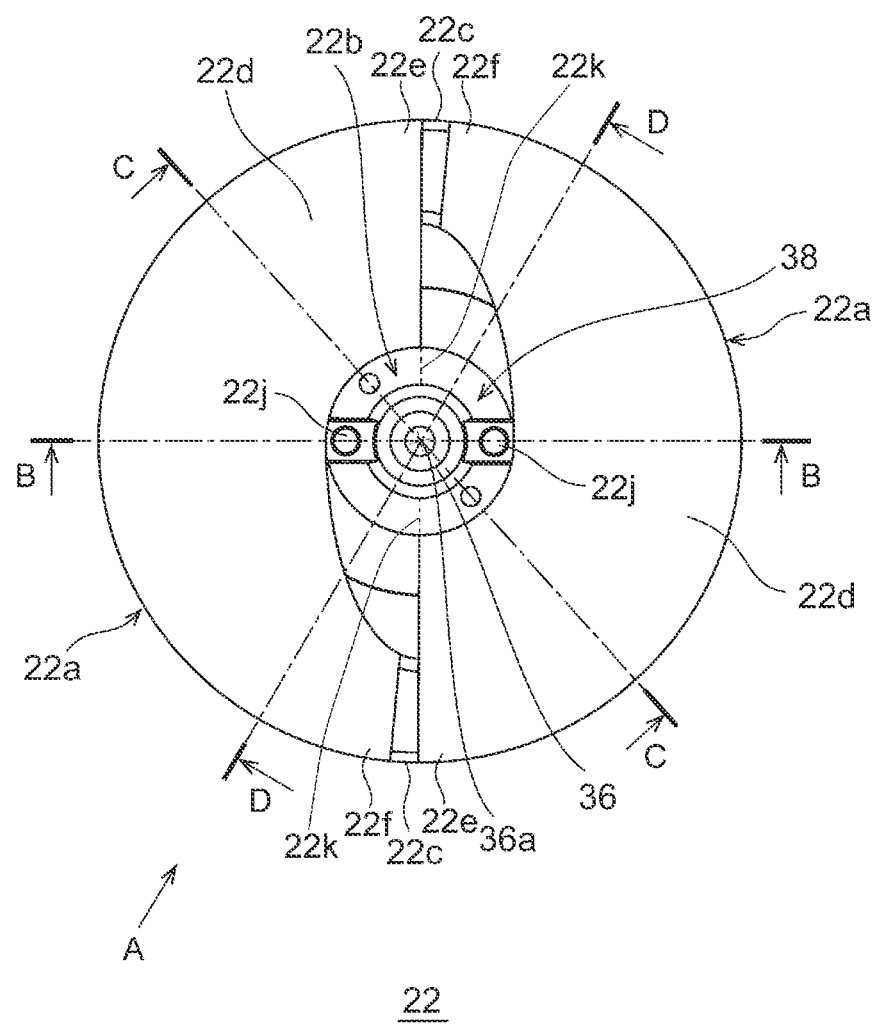
FIG. 4 is a front view of the rotating reflector according to the embodiment.
Figure 5:
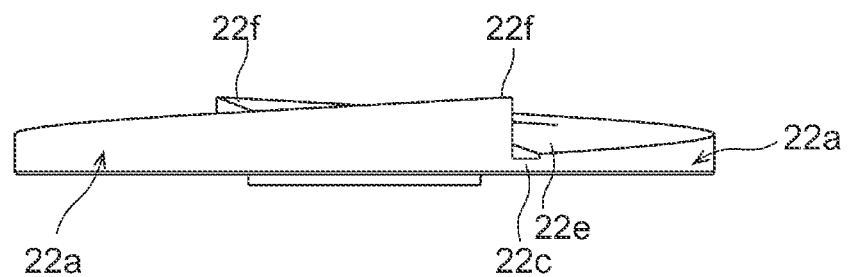
FIG. 5 is a side view of the rotating reflector shown in FIG. 4 as viewed in A direction.
Figure 6A:
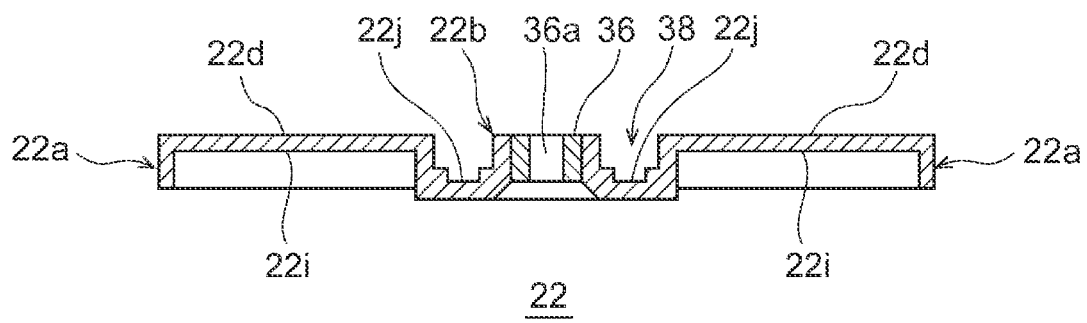
FIG. 6A is a B-B cross-sectional view of the rotating reflector shown in FIG. 4.
Figure 6B:
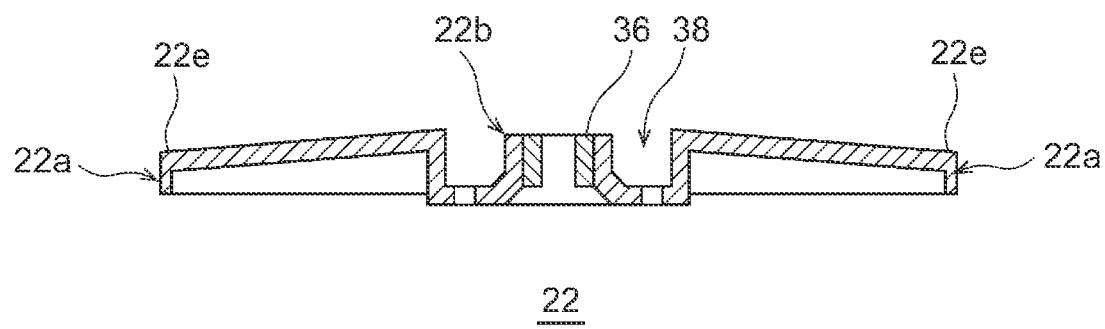
FIG. 6B is a C-C cross-sectional view of the rotating reflector shown in FIG. 4.
Figure 6C:
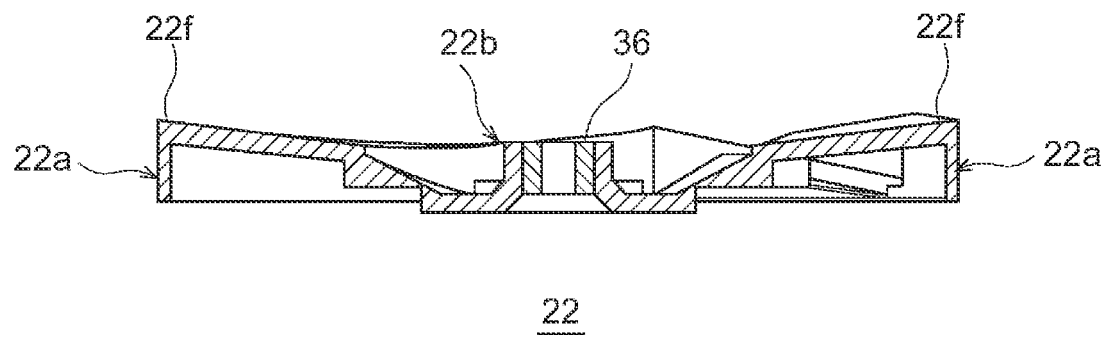
FIG. 6C is a D-D cross-sectional view of the rotating reflector shown in FIG. 4.

A description will now be given of the detail of the structure of the rotating reflector 22 according to the embodiment and a method of manufacturing the rotating reflector 22. FIG. 3 is a perspective view of the rotating reflector according to the embodiment. FIG. 4 is a front view of the rotating reflector according to the embodiment. FIG. 5 is a side view of the rotating reflector shown in FIG. 4 as viewed in A direction. FIG. 6A is a B-B cross-sectional view of the rotating reflector shown in FIG. 4; FIG. 6B is a C-C cross-sectional view of the rotating reflector shown in FIG. 4; and FIG. 6C is a D-D cross-sectional view of the rotating reflector shown in FIG. 4.

The rotating reflector 22 is a resin component having the rotating part 22b and a plurality of (two) blades 22a provided around the rotating part 22b and functioning as reflecting surfaces. The blades 22a are arc-like. The outer circumferential parts of the adjacent blades 22a are connected at a linking part 22c so as to form an annular shape. This makes it difficult for the rotating reflector 22 to warp even if the rotating reflector 22 is rotated at a high speed (e.g., 50-240 revolutions/s).

A cylindrical sleeve 36 formed with a hole 36a, in which the rotary shaft of the rotating reflector 22 is inserted and fitted, is fixed at the center of the rotating part 22b by insert molding. Further, an annular groove 38a formed on the outer circumferential part of the rotating part 22a inside the blade 22a is formed with two recesses 22j as traces corresponding to the gate locations of the mold.

(Method of Manufacturing Rotating Reflector)

Figure 7:
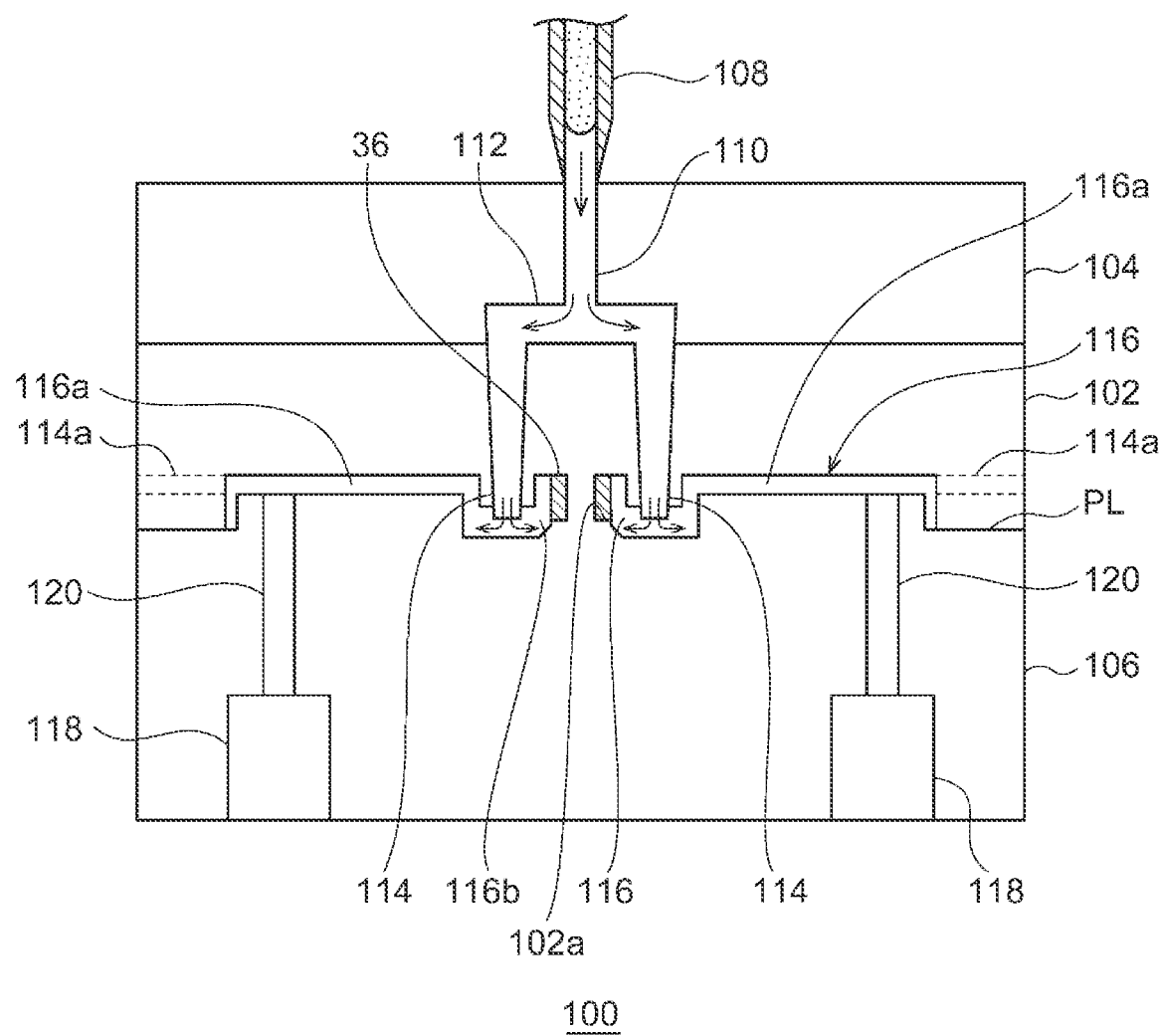
FIG. 7 is a schematic view for explaining a method of manufacturing the rotating reflector according to the embodiment.

FIG. 7 is a schematic view for explaining a method of manufacturing the rotating reflector according to the embodiment. A mold 100 shown in FIG. 7 includes molds 102, 104 on the fixed side a mold 106 on the movable side. Molten resin injected from a injection molding machine 108 is injected into a cavity 116 from a gate 114 via a sprue 110 and a runner 112. When the molten resin has filled the cavity 116 and is solidified, the mold 106 on the movable side is released from the mold 102, sandwiching a parting line PL. A driver apparatus 118 causes a extrusion pin 120 protruding from the surface of the mold 106 to remove the rotating reflector 22 from the mold.

When the rotating reflector 22 is released from the gate 114 of the mold after injection molding using such a mold, a burr may remain in the neighborhood of the recesses 22j shown in FIG. 4, etc. In the mold 102 according to the embodiment, however, the gate 114 is formed in a cavity part 116b corresponding to the rotating part 22b, instead of in a cavity part 116a corresponding to the blade 22a of the rotating reflector 22.

Therefore, a burr remains, even if it does, on the side of the rotating part (toward the center) of the rotating reflector 22. Thus, in comparison with a case in which a gate 114a is provided outside the cavity part 116a shown in FIG. 7 and a burr is produced on the outer circumferential surface of the blade 22a of the rotating reflector 22, the inertia produced when the rotating reflector 22 is rotated is decreased, and degradation in rotational balance of the rotating reflector 22 is reduced. Therefore, the impact (eccentricity and vibration) on rotation accuracy is suppressed.

Further, the gate 114 according to the embodiment is provided on the same side as the part of the cavity part 116a turned into a reflecting surface 22d (see FIG. 6A) of the blade 22a. The extrusion pin 120 used to extrude and remove the rotating reflector 22 from the mold 106 affects light reflection if the track of extrusion remains on the reflecting surface 22d of the blade 22a. To address this, the extrusion pin 120 is provided to push a surface 22i opposite to the reflecting surface 22d of the blade 22a because light reflection is not affected that way. When the extrusion pin 120 is provided in this way and when the gate is provided on the side opposite to the reflecting surface 22d of the blade 22a of the rotating reflector 22, both the gate and the extrusion pin 120 will have to be provided in the mold 106 opposite to the reflecting surface of the blade, making the structure of the mold 100 and combination therein complicated.

The aforementioned problem is resolved in the mold 100 according to the embodiment by providing the gate 114 in the mold 102 (cavity mold) on the fixed side and providing the extrusion pin in the mold 106 (core mold) on the movable side.

The gate 114 according to the embodiment is formed at a position that faces the rotating part 22b. This ensures that, even if a burr is produced, the burr is formed in the rotating part 22b so that degradation in rotational balance of the rotating reflector 22 is reduced.

The number of gates 114 according to the embodiment formed is the same as the number of blades 22a formed. This ensures that molten resin is evenly injected for molding from the respective gates 114 into the cavity parts 116a corresponding to the respective blades 22a.

In the mold 102, a mounting part 102a which forms a part of the rotating part 22b and on which is mounted a non-resin component (e.g., the sleeve 36 as a ring-like member made of metal or ceramic), in which the rotary shaft is inserted, is formed in the neighborhood of the gate 114. The increases the bonding strength of the resin part and the sleeve 36 during insertion molding because the molten resin injected from the gate 114 is solidified as it comes into contact with the metallic non-resin component at a relatively high temperature in the initial stage of molding.

Further, the recesses 22*j*, which are the plurality of traces of the gates, are formed, as shown in FIG. 6A, between the hole 36*a* and the blades 22*a* in the rotating reflector 22 according to the embodiment. Therefore, welds 22*k* (see FIG. 4), in which the molten resin injected from the plurality of gates 114 converge, are formed around the hole 36*a* and in the neighborhood of the recesses 22*j* of the rotating reflector 22.

In the mold 100 used in the manufacturing method according to the embodiment, the molten resin injected from the plurality of gates 114 converge at a relative high temperature in the initial stage of molding to form the welds 22*k* around the hole 36*a* and in the neighborhood of the recesses 22*j*. Therefore, improper adhesion and poor mechanical strength in the welds 22*k* are mitigated.

Second Embodiment

The optical unit having the lens unit according to the embodiment can be used in a variety of vehicle lamps.
(Lens Unit)

Figure 8:
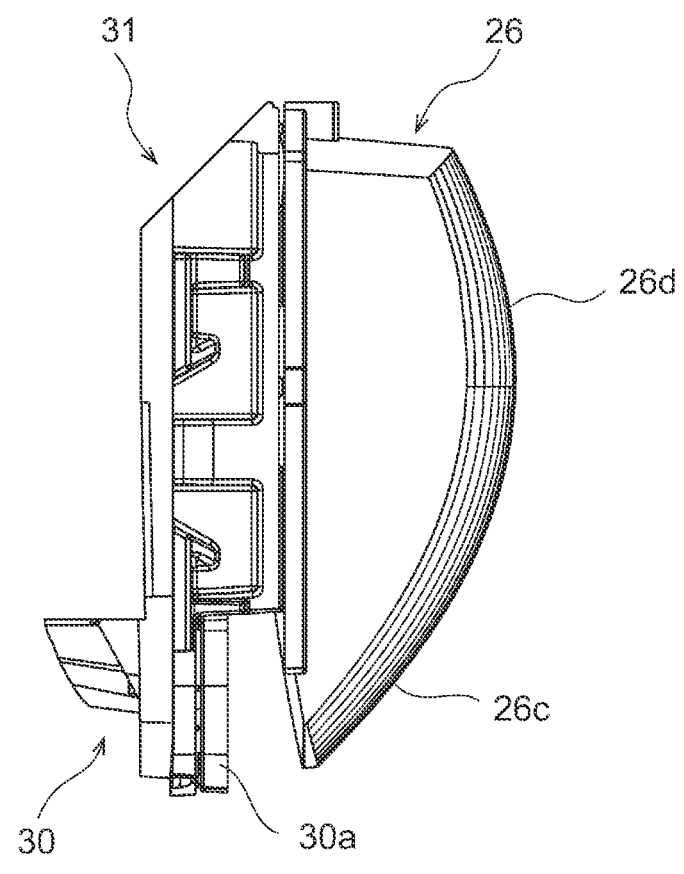
FIG. 8 is a top view of the lens unit according to the embodiment.
Figure 9:
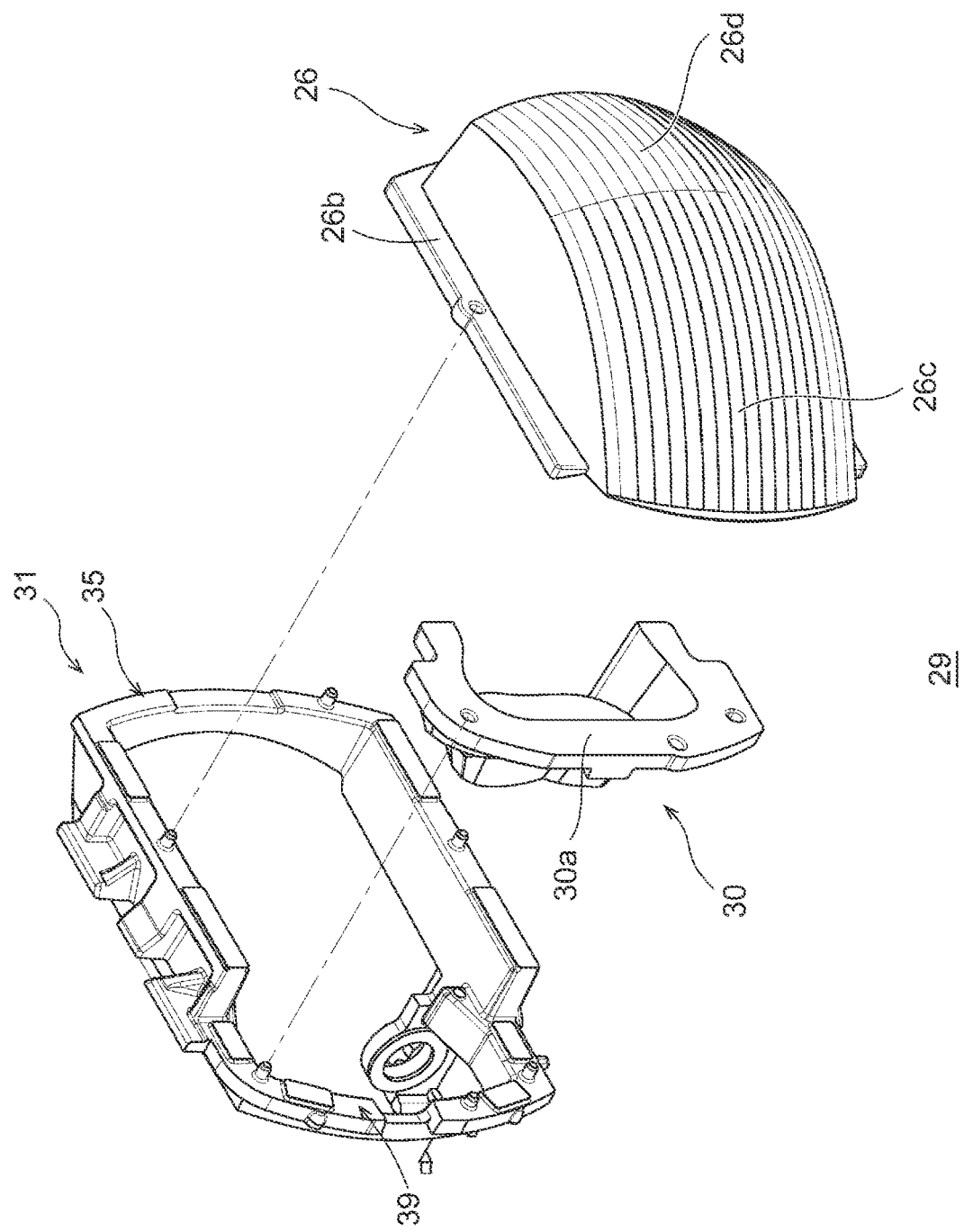
FIG. 9 is an exploded perspective view of the lens unit according to the embodiment.
Figure 10:
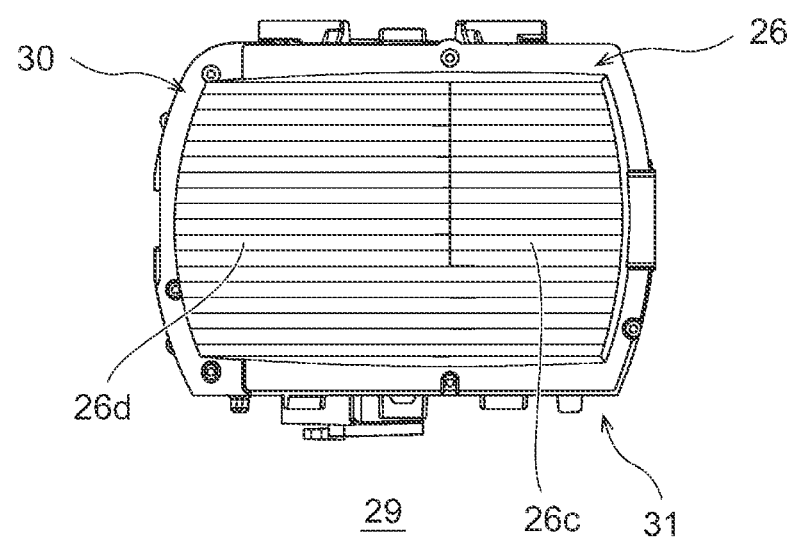
FIG. 10 is a front view of the lens unit according to the embodiment.

A description will now be given of the lens unit according to the embodiment. FIG. 8 is a top view of the lens unit according to the embodiment. FIG. 9 is an exploded perspective view of the lens unit according to the embodiment. FIG. 10 is a front view of the lens unit according to the embodiment.

A lens unit 29 includes the convex lens 26 as a first lens provided on the emission side (toward the front cover 14) of the vehicle head lamp 10, the diffusion lens 30 as a second lens provided on the incidence side (toward the first light source 20 and the second light source 28), and a holder 31 for holding the convex lens 26 and the diffusion lens 30. The convex lens 26 and the diffusion lens 30 are transparent resin molded product, and, for example, acryl is used as a material.

The convex lens 26 overlaps the diffusion lens 30 at least in part as viewed from the emission side (the front side of the lens unit 29 shown in FIG. 9). This causes the convex lens 26 and the diffusion lens 30 to be held by the holder 31 such that they overlap as viewed from the emission side and so realizes a compact size of the lens unit 29.
(Holder)

Figure 11:
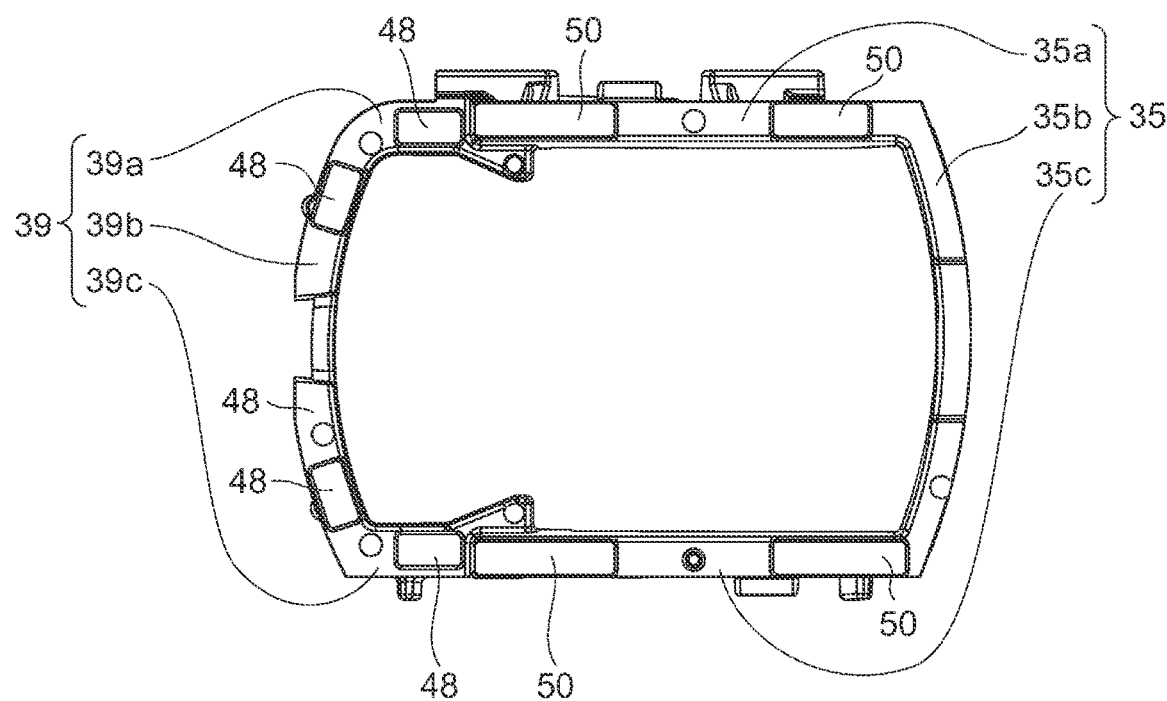
FIG. 11 is a front view of the holder according to the embodiment.
Figure 12:
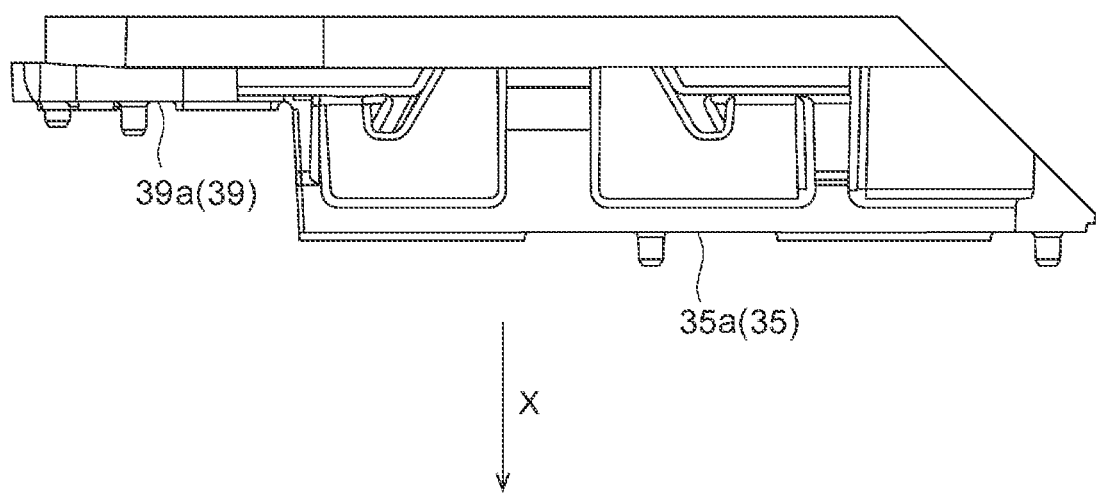
FIG. 12 is a top view of the holder according to the embodiment.

FIG. 11 is a front view of the holder 31 according to the embodiment. FIG. 12 is a top view of the holder 31 according to the embodiment. The holder 31 has a U-shaped first mounting part 35 having three sides 35*a*-35*c* on which the convex lens 26 is mounted and a U-shaped second mounting part 39 having three sides 39*a*-39*c* on which the diffusion lens 30 is mounted. Further, as show in FIG. 12, the first mounting part 35 is formed further on the emission side X than the second mounting part 39. In this way, the convex lens 26 can be provided on the emission side.

The holder 31 is, as shown in FIG. 9 and FIG. 11, a cylindrical member (e.g., a colored resin molded product that is non-transparent to laser light) that transmits light inside. For example, polycarbonate is used as a material. The first mounting part 35 and the second mounting part 39 are formed on one end surface (end surface on the emission side X) of the holder 31.

In the method of manufacturing the lens unit according to the embodiment, a flange part 30*a* of the diffusion lens 30 is first positioned in the second mounting part 39, and a weld part 48 is fused by laser transmitted through the transparent diffusion lens 30. This fixes the diffusion lens 30 in the holder 31. A flange part 26*b* of the convex lens 26 is then positioned in the first mounting part 35, and a weld part 50 is fused by laser transmitted through the transparent convex lens 26. This fixes the convex lens 26 in the holder 31. This allows, as shown in FIG. 4, the convex lens 26 and the diffusion lens 30 to be assembled in the holder 31 from the same direction. Further, laser irradiation can be performed from the same side so that it is easy to build the layout of the manufacturing line.

Further, as shown in FIGS. 1 through 10, the convex lens 26 has a first region 26*c* that transmits the light emitted from the first light source 20 and a second region 26*d* that transmits the light emitted from the second light source 28 and transmitted through the diffusion lens 30. This allows the light transmitted through the diffusion lens 30 to be further controlled by the convex lens 26. In other words, the second light source 28 according to the embodiment includes the first light source 20, the second light source 28, the lens unit 29, and the rotating reflector 22 that reflects the light emitted from the first light source 20 toward the first region 26*c* with the rotating reflecting surface.

Variation

Figure 13:
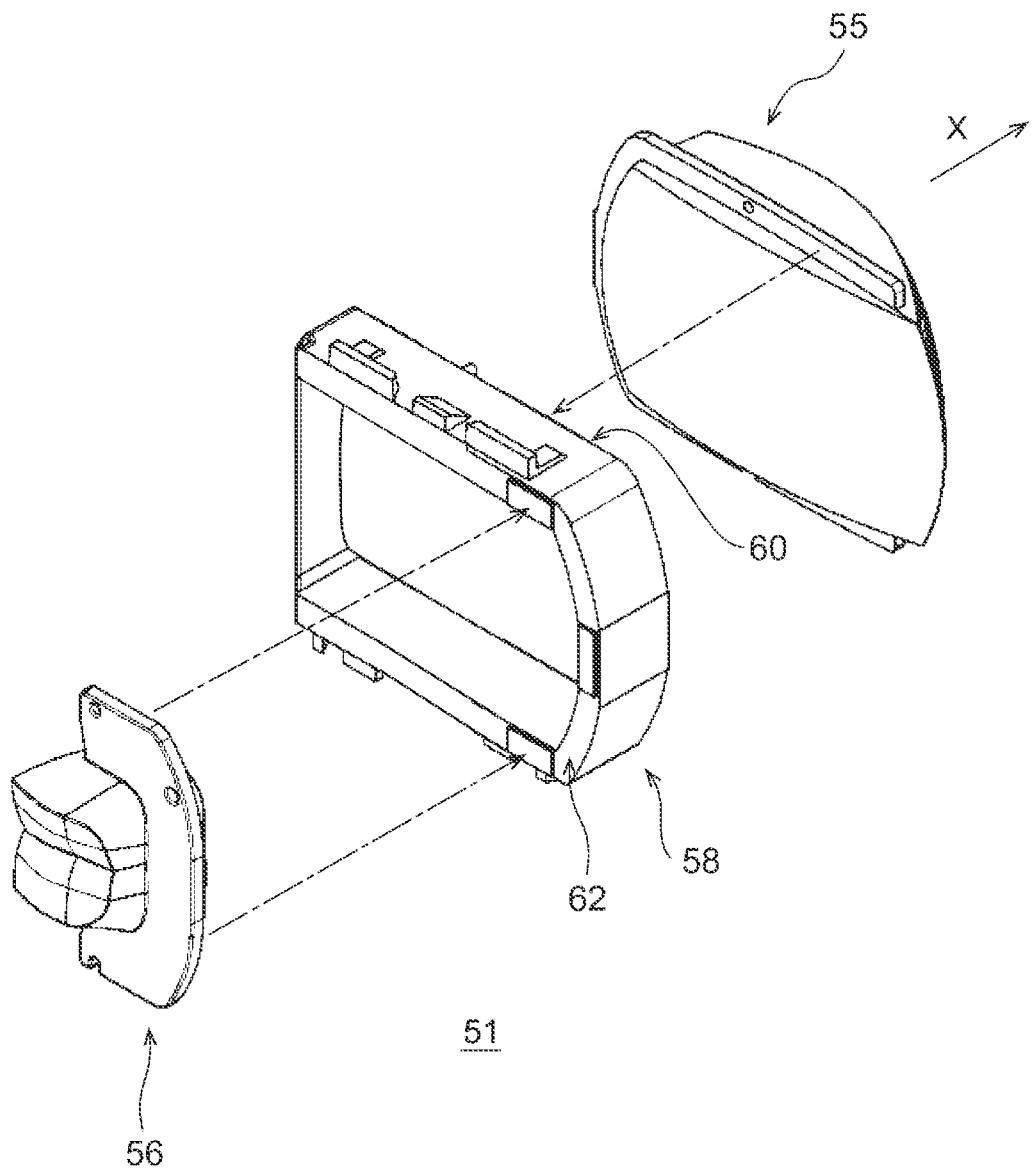
FIG. 13 is an exploded perspective view of the lens unit according to the variation of the embodiment.

FIG. 13 is an exploded perspective view of the lens unit according to the variation of the embodiment. A lens unit 51 shown in FIG. 13 includes a convex lens 55 provided on the emission side (toward the front cover 14) of the vehicle headlamp 10, a diffusion lens 56 provided on the incidence side (toward the first light source 20 and the second light source 28), and a holder 58 for holding the convex lens 55 and the diffusion lens 56. The convex lens 55 and the diffusion lens 56 have the same shapes as the convex lens 26 and the diffusion lens 30, respectively, except for the detail, and the function and material thereof are substantially the same.

Unlike the case of the aforementioned lens unit 29, the diffusion lens 56 and the diffusion lens 56 of the lens unit 51 according to the variation are assembled in the holder 58 from different directions.

More specifically, the holder 58 has a first mounting part 60 on which the convex lens 55 is mounted and a second mounting part 62 on which the diffusion lens 56 is mounted. Further, as show in FIG. 13, the first mounting part 60 is formed further on the emission side X than the second mounting part 62. In this way, the convex lens 55 can be provided on the emission side.

Third Embodiment

The optical unit having the optical member according to the embodiment can be used in a variety of vehicle lamps.
(Condensing Lens)

Figure 14:
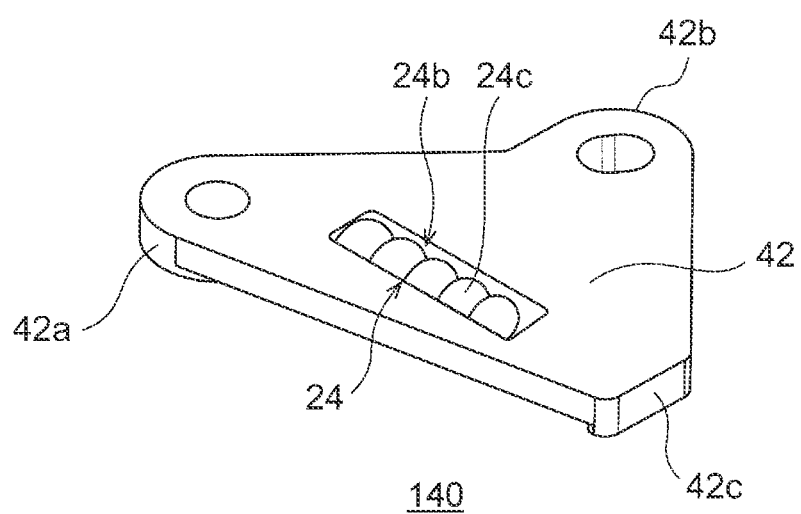
FIG. 14 is a perspective view of the optical member according to the embodiment.
Figure 15:
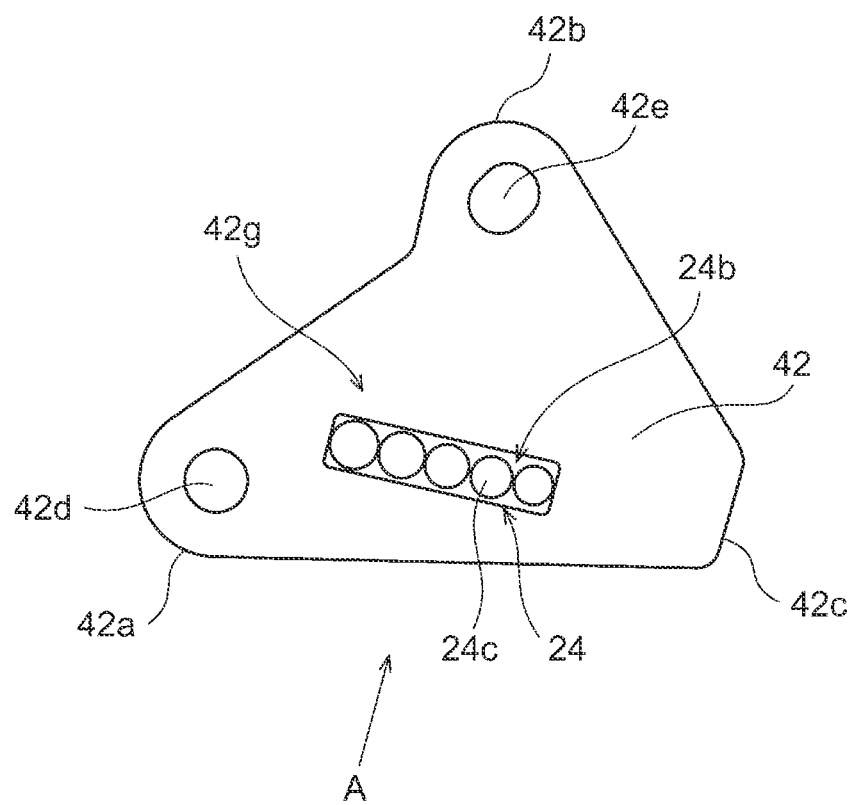
FIG. 15 is a top view of the optical member according to the embodiment.
Figure 16:
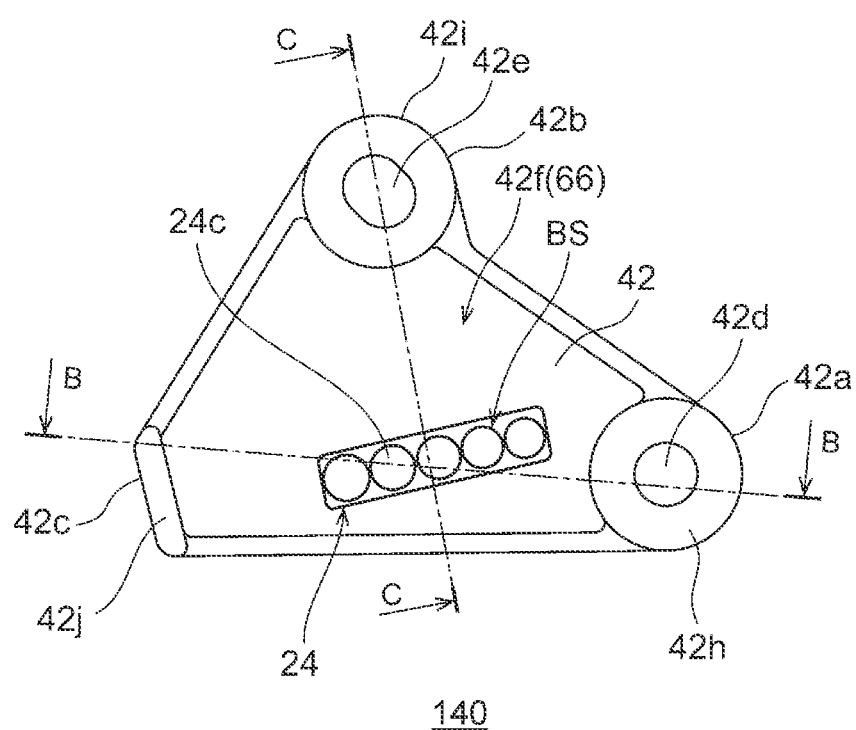
FIG. 16 is a bottom view of the optical member according to the embodiment.
Figure 17:
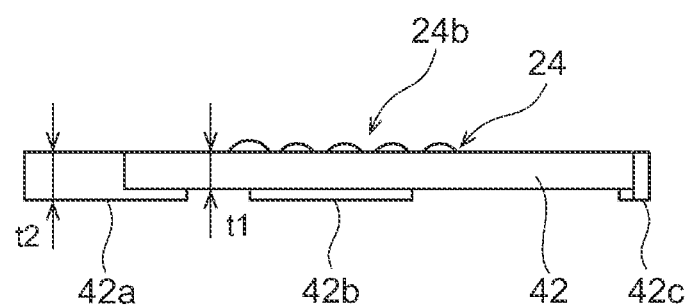
FIG. 17 is a side view of the optical member shown in FIG. 15 as viewed in A direction.
Figure 18:
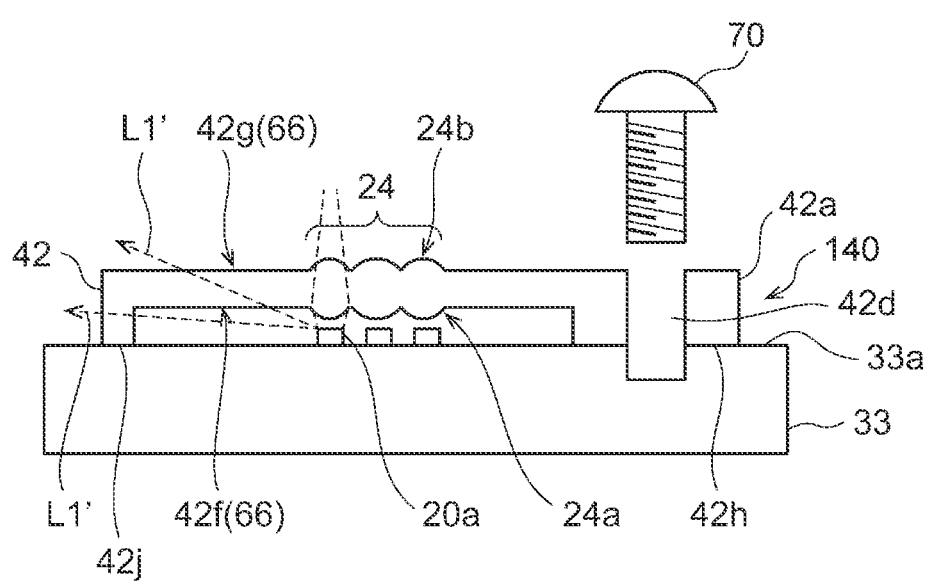
FIG. 18 is a schematic diagram showing a B-B cross section of the optical member shown in FIG. 16.
Figure 19:
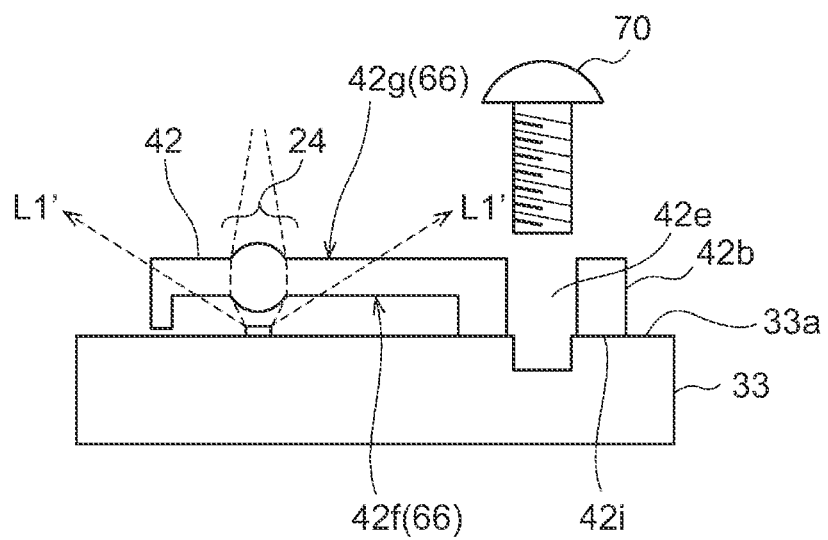
FIG. 19 is a schematic view showing a C-C cross section of the optical member shown in FIG. 16.

A description will now be given of the optical member according to the embodiment. FIG. 14 is a perspective view of the optical member according to the embodiment. FIG. 15 is a top view of the optical member according to the embodiment. FIG. 16 is a rear view of the optical member according to the embodiment. FIG. 17 is a side view of the optical member shown in FIG. 15 as viewed in A direction. FIG. 18 is a schematic diagram showing a B-B cross section of the optical member shown in FIG. 16. FIG. 19 is a schematic view showing a C-C cross section of the optical member shown in FIG. 16. FIGS. 18 and 19 show, aside from an optical member 140, the circuit substrate 33, on which the optical member 140 is mounted, and the LED 20*a*.

The optical member 140 according to the embodiment has the condensing lens 24 as an optical controller for controlling the light incident from a back side BS and outputting the light from a front side 24b and a plate-shaped base part 42 adjacent to the condensing lens 24. The condensing lens 24 has a plurality of lens parts 24c respectively corresponding to the light emitted from the plurality of LEDs 20a as a plurality of light emitting devices. Controlling light means, for example, directing light to a desired pattern, direction, or area.

The lens parts 24c in the optical member 140 according to the embodiment are shaped to condense light by refracting transmitted light. One lens part 24c is associated with one LED 20a. Both the back side BS and the front side 24b of the lens part 24c according to the embodiment are convex shaped. Further, the surface region of the front side 24b of the optical controller, through which the light emitted from the LED 20a is transmitted and output, also functions as a light emission surface of a pseudo light source.

As shown in FIG. 17, the base part 42 has thick parts 42a, 42b, 42c having a thickness larger than a thickness t1 (t2>t1) around the condensing lens 24. The thick parts 42a, 42b, 42c are formed in the neighborhood of the periphery (outer edge part) of the base part 42. This suppresses warp of the optical member 140 itself. The thick parts 42a, 42b are formed with through holes 42d, 42e, respectively, for screw clamping. This allows the thick parts 42a, 42b to receive the fastening power when the optical member 140 is fixed to the circuit substrate 33 by a screw 70 so that warp of the optical member 140 itself is suppressed. The thickness of the base part 42 is 0.1 mm or larger, and, preferably, about 0.3 mm-5 mm. Thus, the optical member 140 is a component having a small thickness.

The thick parts 42a, 42b, 42c of the optical member 140 has fitting surfaces 42h, 42i, 42j that come into contact with a surface 33a of the circuit substrate 33 when the optical member 140 is fixed to the circuit substrate 33. The fitting surfaces 42h, 42i, 42j are provided in three corners of the optical member 140, respectively, and help reduce the inclination that results when the optical member 140 is fixed to the circuit substrate 33.

Thus, the optical member 140 according to the embodiment is a member in which the area outside the condensing lens 24 is large. If it is attempted to manufacture the optical member 140 integrally with the transparent condensing lens 24, therefore, it will be necessary to form the entirety by a transparent material.

The optical member 140 according to the embodiment is an injection molded product made of a transparent material. For example, heat-resistant silicone, acryl, polycarbonate, glass, etc. can be used. Preferably, heat-resistant silicone (heat resistant temperature of 180° or higher) or glass is used from the perspective of heat resistance. Further, heat-resistant silicone, which makes forcible release from the mold relatively easy, is more preferable from the perspective of freedom in the design of the optical member. This makes it possible to manufacture an optical member having a shape with a certain complexity, by using a simple mold configuration and manufacturing method.

The optical member 140 manufactured by using the aforementioned material has a wide area outside the condensing lens 24. Therefore, a portion of the light emitted from the LED 20a may not be guided to the condensing lens 24 and transmitted through the base part 42. A description will now be given of this issue. As shown in FIGS. 18 and 19, a portion of the light radially emitted from the LED 20a is not guided toward the condensing lens 24 and is incident from a back side 42f of the base part 42 and is output from a front side 42g. Such light (non-controlled light L1') is not transmitted through the condensing lens 24 and so is not controlled to form a desired light pattern. For this reason, the non-controlled light L1' reflected or transmitted in respective parts of the optical unit 18 and the vehicle headlamp 10 may produce a glare when output from the vehicle headlamp 10.

To address this, the base part 42 according to the embodiment has a scattering part 66 that scatters at least a portion of the light incident from the back side 42f or the light output from the front side 42g. The scattering part 66 can be realized by providing minute convexities and concavities on the front side 42g or the back side 42f, containing a scattering agent (air bubbles) inside the base part 42, or changing the transmittance by transforming the base part 42 with a thermal process, light irradiation, etc.

The scattering part 66 according to the embodiment is a crimped surface produced by configuring the surface of the back side 42f or the front side 42g of the base part 42 to have an arithmetic mean roughness Ra of 0.3 μm or larger. Preferably, Ra is 0.5 μm or larger, and, more preferably, Ra is 1.0 μm or larger. The surface roughness of the condensing lens 24 is preferably smaller than the surface roughness of the base part 42 and is preferably 0.1 μm or smaller. Adjustment of Ra is possible by adjusting the roughness of the portion of the mold interior surface used in injection molding that is in contact with the base part or the condensing lens.

Thus, the optical member 140 according to the embodiment can scatter (blur), of the light emitted from the LED 20a, the light incident on the base part 42 without being incident on the condensing lens 24. This suppresses occurrence of glare due to the non-controlled light L1' transmitted through the base part 42 or makes it difficult to recognize a glare as such.

Further, the vehicle headlamp 10 according to the embodiment includes the first light source 20 having the plurality of LEDs 20a, the optical member 140 for controlling light distribution of the light emitted respectively from the plurality of LEDs 20a, and the convex lens 26 for projecting the light, for which light distribution is controlled by the optical member 140, forward with respect to the vehicle. This suppresses occurrence of glare to pedestrians located in front of the vehicle or passengers of the vehicle.

Fourth Embodiment

The optical unit having the linking structure according to the embodiment can be used in a variety of vehicle lamps.

(Linking Structure)

Figure 20:
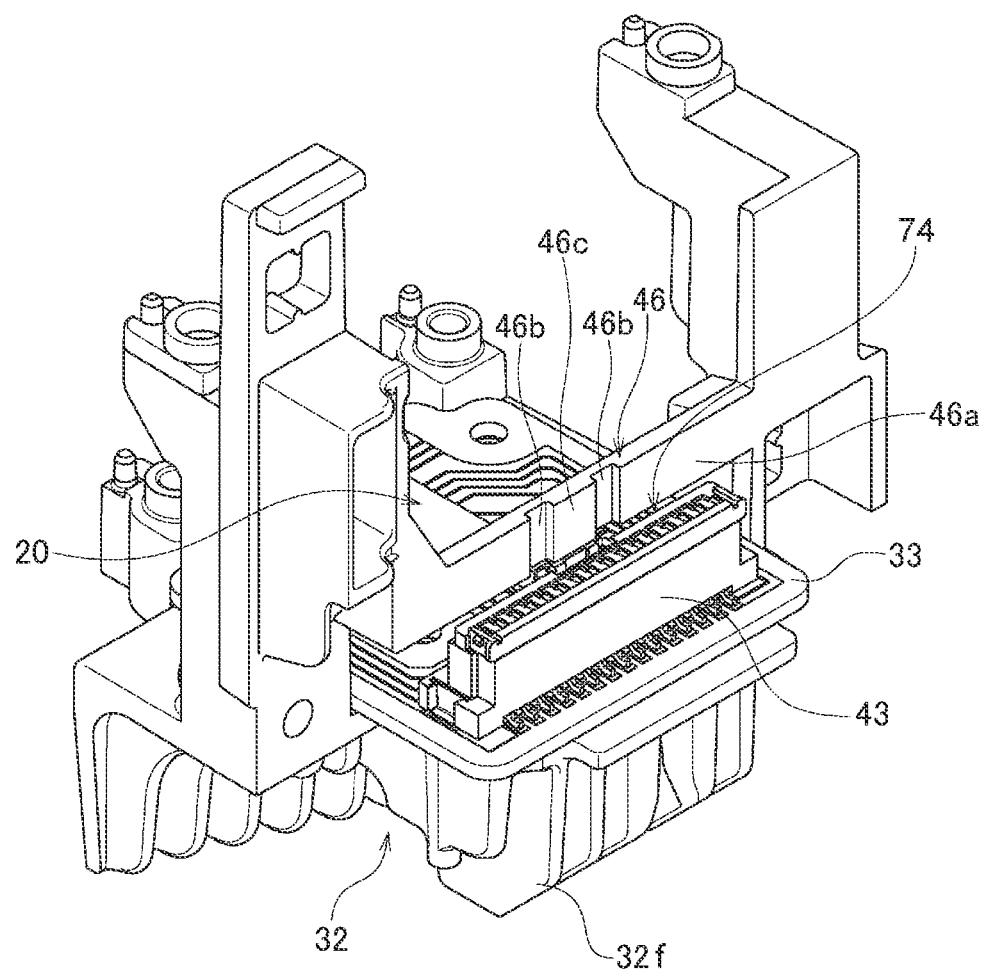
FIG. 20 is a perspective view showing a schematic structure of the linking structure according to the embodiment having a heat sink on which the first light source is mounted.
Figure 21:
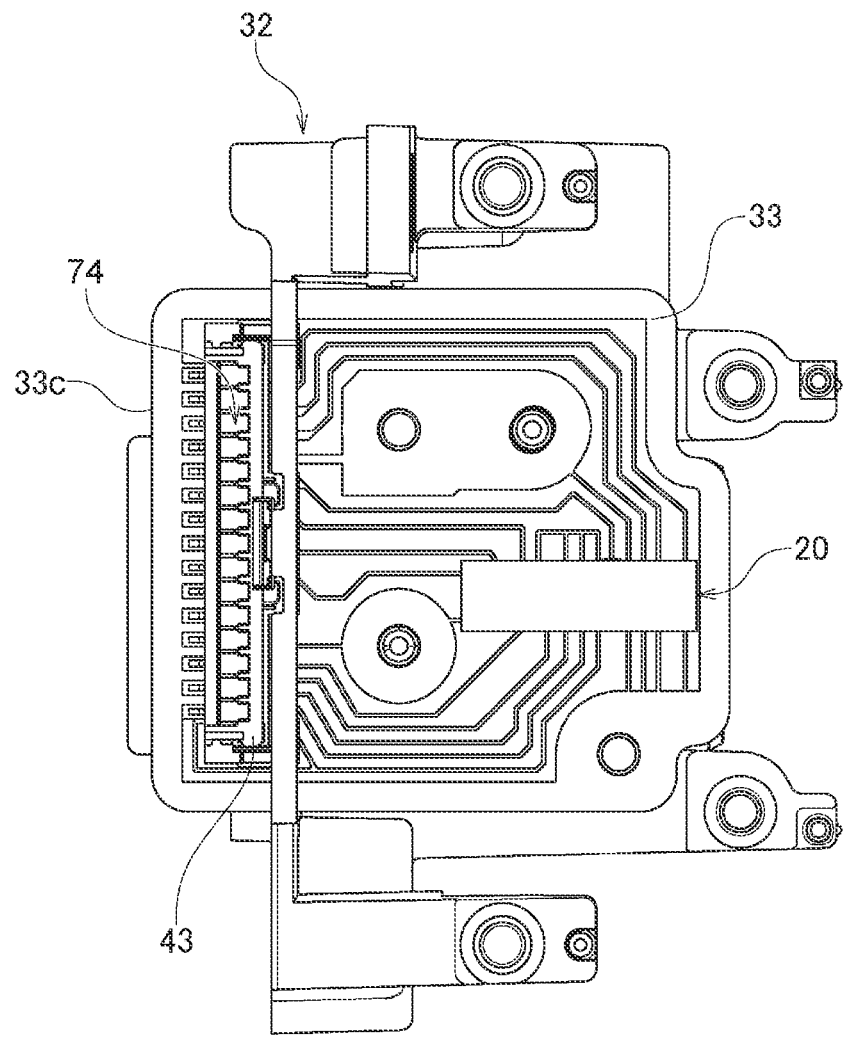
FIG. 21 is a top view of the linking structure shown in FIG. 20 as viewed from above the first light source.
Figure 22A:
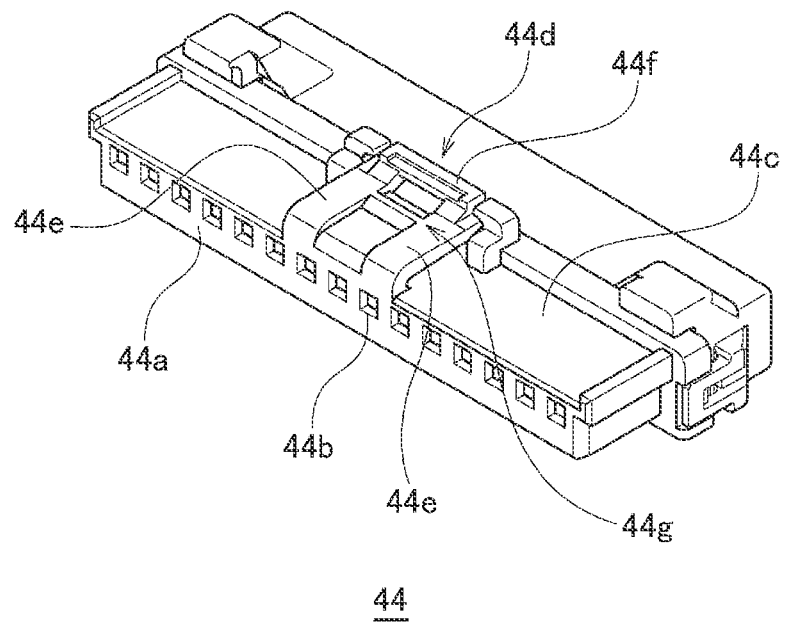
FIG. 22A is a perspective view of a second connector according to the embodiment.
Figure 22B:
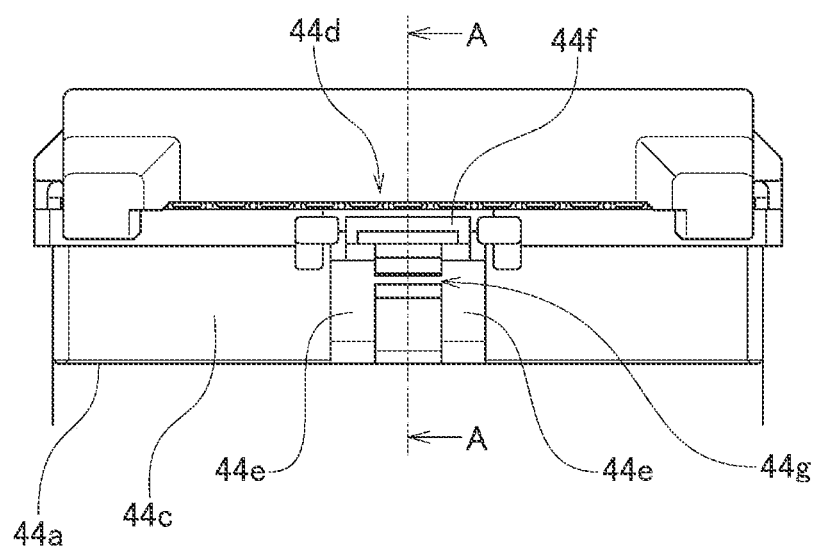
FIG. 22B is a front view of the second connector according to the embodiment.
Figure 23:
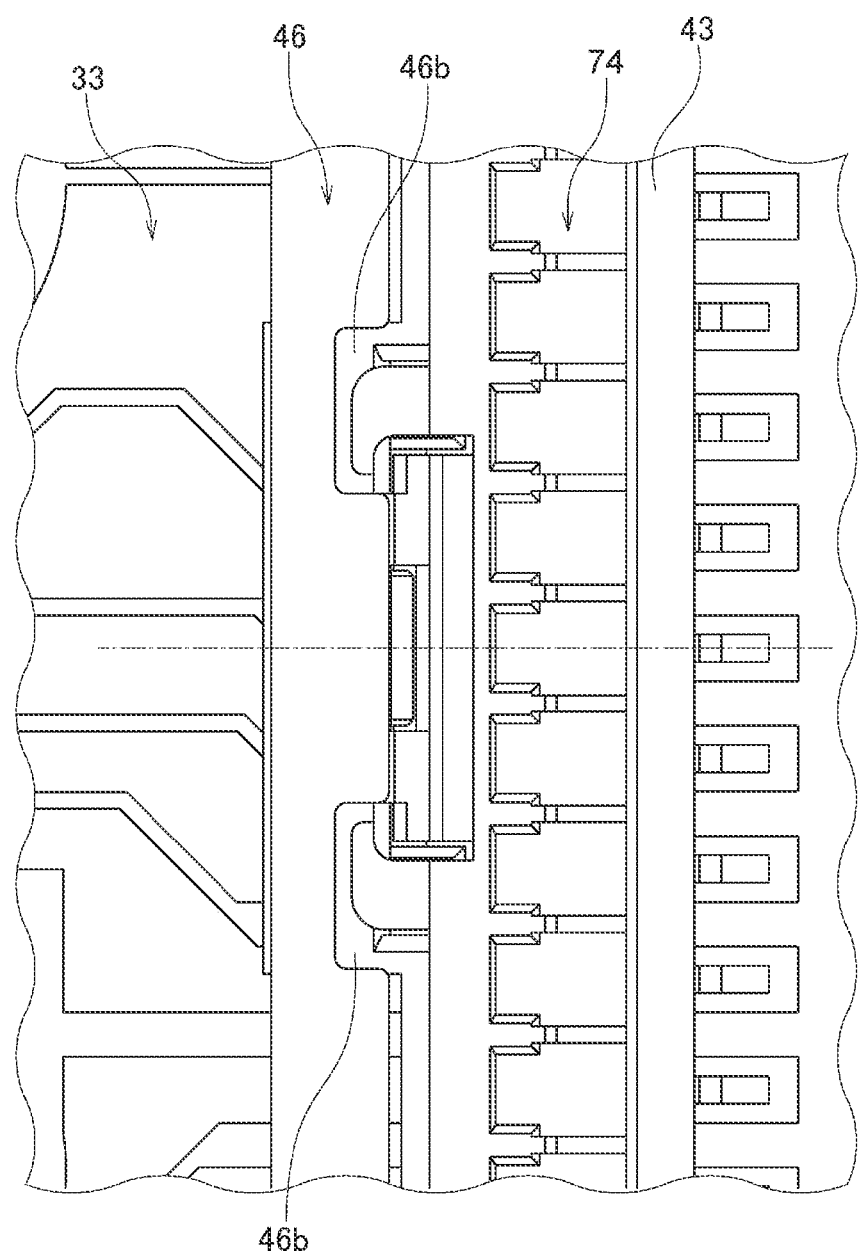
FIG. 23 is a front view of the second connector according to the embodiment.

A description will now be given of the linking structure according to the embodiment. FIG. 20 is a perspective view showing a schematic structure of the linking structure according to the embodiment having a heat sink on which the first light source is mounted. FIG. 21 is a top view of the linking structure shown in FIG. 20 as viewed from above the first light source 20. FIG. 22A is a perspective view of a second connector according to the embodiment, and FIG. 22B is a front view of the second connector according to the embodiment. FIG. 23 is a front view of the second connector according to the embodiment. In FIG. 20 and FIG. 21, the second connector is omitted from the illustration.

A linking structure 45 according to the embodiment includes the heat sink 32, the circuit substrate 33 mounted on the heat sink 32 and formed with a power feeding channel for the first light source 20, a first connector 43 fixed on the circuit substrate 33, and a guide part 46 that guides a second connector 44 toward the first connector 43 when the second connector 44 on the side of the code connected to a controller and a power feeding apparatus is connected to the first connector 43.

The guide part 46 according to the embodiment is fixed to the heat sink 32 and is formed integrally with the heat sink 32. A metal such as aluminum, copper, and iron or an alloy that has high heat radiation performance is used for the heat sink 32. The heat sink 32 according to the embodiment has a fixing part for fixing the heat sink 32 in the lamp chamber 16 of the vehicle headlamp 10. The heat sink 32 also has a complex shape provided with holes and projections for mounting a large number of components. Therefore, the heat sink 32 is preferably made of a heat dissipating material suitable for casting. For example, a material based on aluminum, with copper, silicon, magnesium, etc. added, may be used.

The first connector 43 is a male connector and is fixed along one side 33c at the outer edge of the rectangular circuit substrate 33 so as to be in conduction with the wiring pattern formed on the circuit substrate 33.

The second connector 44 is a female connector. A plurality of holes 44b, into which the male pins of the first connector 43 are inserted, are formed in a line at a leading edge 44a connected to the first connector. A latch part (lock part) 44d is formed on a side surface 44c of the second connector 44. The second connector 44 and the first connector 43 are mutually connected by warping the latch part 44d and pushing it toward the first connector 43.

The guide part 46 is provided at a position above and distanced from the circuit substrate 33 so as not to interfere with the circuit substrate 33. The ends of the guide part 46 extend as far as the neighborhood of the fin 32f of the heat sink 32, bypassing the circuit substrate 33.

Figure 24:
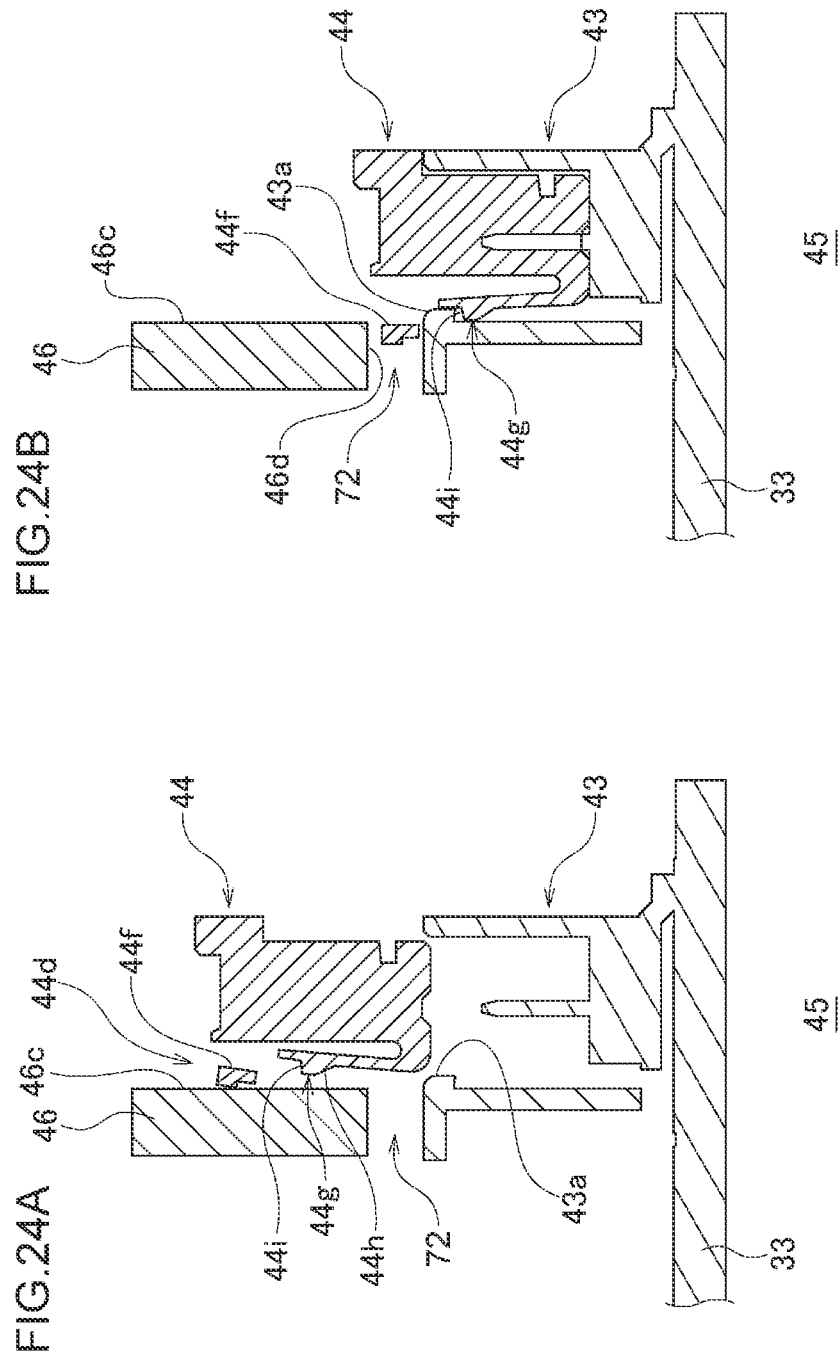
FIGS. 24A and 24B are schematic diagrams for explaining how the second connector according to the embodiment is connected to the first connector.

FIG. 23 is an enlarged view of the neighborhood of the guide part of the linking structure according to the embodiment. FIGS. 24A and 24B are schematic diagrams for explaining how the second connector according to the embodiment is connected to the first connector.

As shown in FIG. 20 and FIG. 23, two concave grooves 46b are formed on a side surface 46a of the guide part 46 to extend toward the first connector 43. The latch part 44d of the second connector 44 has guided parts 44e guided by the concave grooves 46b of the guide part 46. Each of the guided parts 44e has a convex shape that extends vertically on the side surface 44c from the leading edge 44a. Further, a flexible pawl 44f is provided at an end of the latch part 44d opposite to the leading edge 44a.

When the second connector 44 is connected to the first connector 43, the second connector 44 is positioned with respect to the first connector 43 such that the guided parts 44e of the second connector 44 are guided by the side surface 46a shown in FIG. 20. This positions the second connector 44 roughly with respect to the first connector 43. As shown in FIG. 24A, the latch part 44d warps as a whole as a result of the pawl 44f of the second connector 44 coming into contact with a flat region 46c between the two concave grooves 46b of the guide part 46.

When the second connector 44 is then pushed further toward the first connector 43, the pawl 44f, which has warped so far, enters a slit 72 between the guide part 46 and the first connector 43.

A convex part 44g is formed between the two guided parts 44e so as to be parallel to the leading edge 44a. The convex part 44g has a first inclined surface 44h extending toward the leading edge 44a and a second inclined surface 44i extending away from the leading edge 44a. The angle of inclination of the second inclined surface 44i is larger than the angle of inclination (angle formed with respect to the side surface 44c) than the first inclined surface 44h.

At about the point of time when the pawl 44f enters the slit 72, the convex part 44g is engaged with a engaging part 43a by going over the engaging part 43a. The angle of inclination of the second inclined surface 44i according to the embodiment is larger than the angle of inclination (angle formed between the second inclined surface 44i and the side surface 44c) than the first inclined surface 44h. For this reason, it is easy for the first inclined surface 44h to go over the engaging part 43a when the second connector 44 is connected to the first connector 43, but, on the other hand, it is difficult for the second inclined surface 44i to go over the engaging part 43a, which makes it difficult for the second connector 44 to be dislodged from the first connector 43.

Thus, the guide part 46 according to the embodiment is configured such that the pawl 44f of the second connector 44 enters the slit 72 between the guide part 46 and the first connector 43. This causes the guided parts 44e of the latch part 44d to be guided by the guide part 46 when the second connector 44 is connected to the first connector 43. Accordingly, workability is improved, and connection failure is reduced. Further, entry of the pawl 44f of the second connector 44 into the slit 72 locks the second connector 44 in the first connector 43 so as not to be removed therefrom.

Further, the guide part 46 is formed with the concave grooves 46b that guide the pawl 44f in a warped state when the second connector 44 is connected to the first connector 43. This causes the pawl 44f of the second connector 44 to be guided by the concave grooves 46b, which makes it possible to warp the pawl 44f without requiring, for example, a human operator to warp the latch part 44d. It is therefore easy to connect the second connector 44 to the first connector 43.

Further, the guide part 46 has an engaging part 46d with which the pawl 44f guided by the concave grooves 46b is engaged while the second connector 44 is fitted in the first connector 43. The engaging part 46d is the lower end surface of the flat region 46c of the guide part 46. This prevents the second connector 44 from being dislodged from the first connector 43.

Further, the first connector 43 is arranged, as shown in FIG. 20 and FIG. 21, such that a connection part 74 faces upward with respect to the substrate surface of the circuit substrate 33. The guide part 46 is provided at a position above and distanced from the connection part 74. Thus, the operator can cause the guide part 46 to guide the second connector 44 toward the first connector 43 while viewing the connection part 74 of the first connector 43 so that workability experienced when the connectors are connected is improved.

Fifth Embodiment

The optical unit having the supporting component according to the embodiment can be used in a variety of vehicle lamps.

(Optical Unit)

Figure 25:
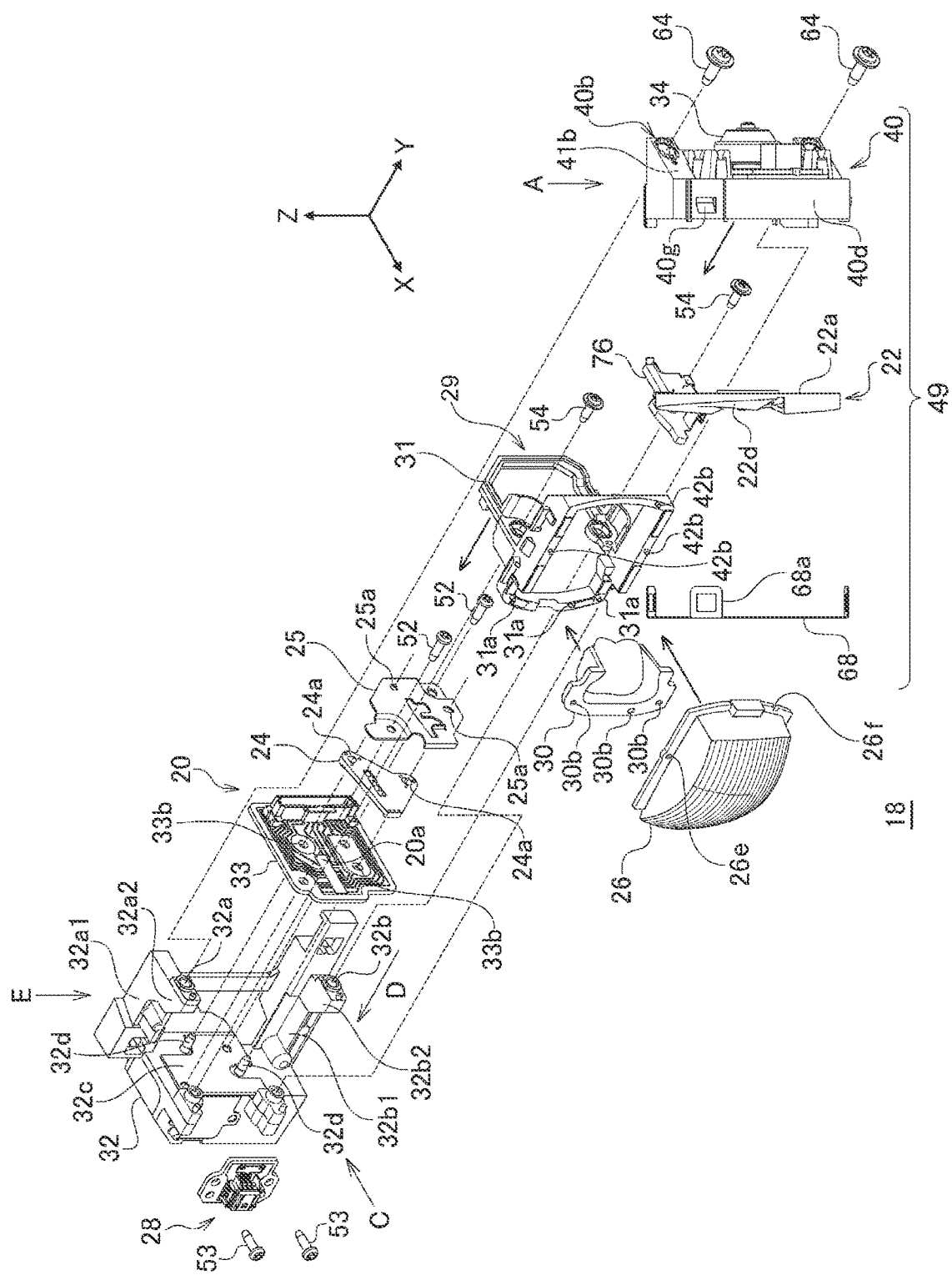
FIG. 25 is an exploded perspective view of the optical unit according to the embodiment.
Figure 26:
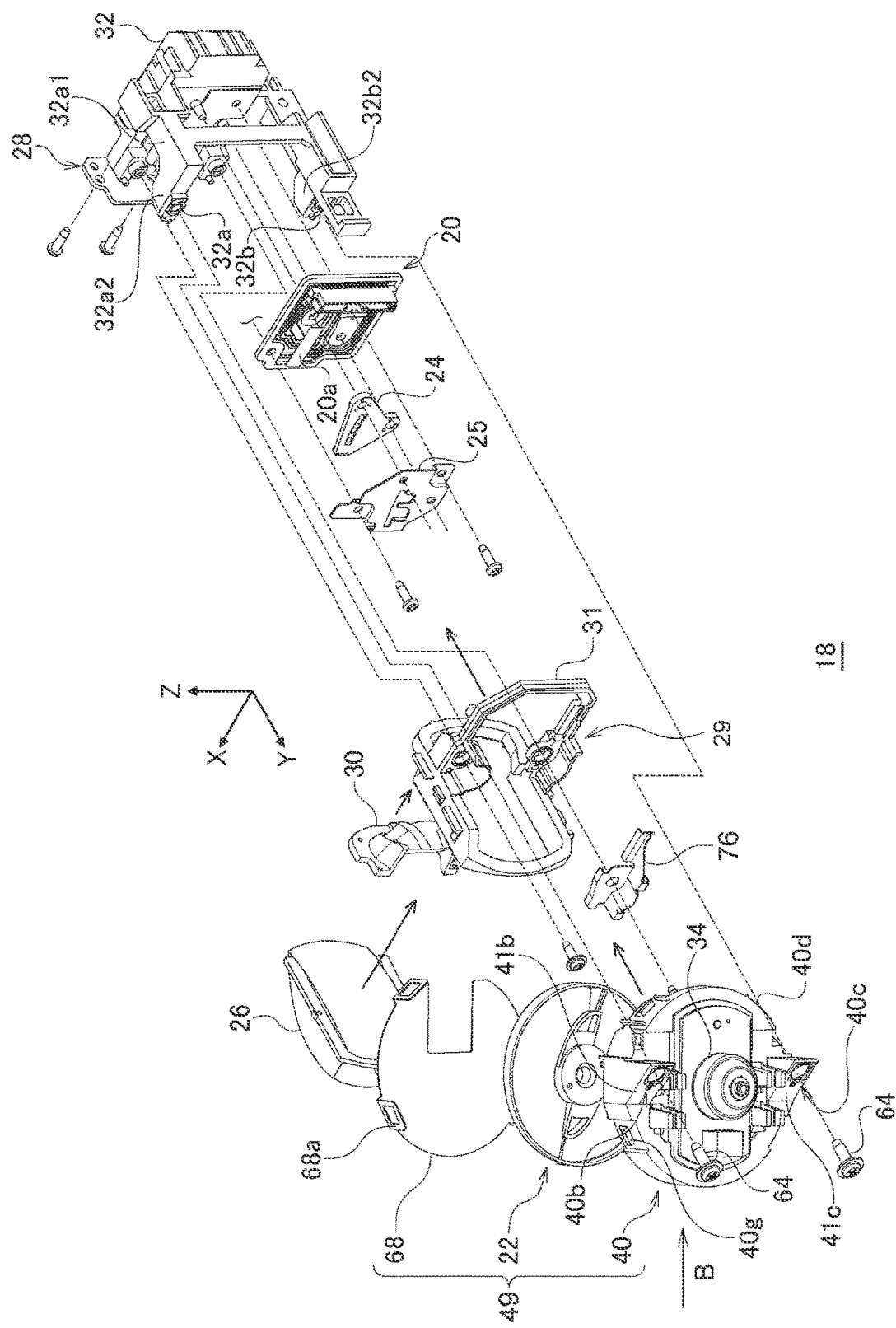
FIG. 26 is an exploded perspective view of the optical unit as viewed in a direction different from that of FIG. 25.

FIG. 25 is an exploded perspective view of the optical unit according to the embodiment. FIG. 26 is an exploded perspective view of the optical unit as viewed in a direction different from that of FIG. 25.

The optical unit 18 according to the embodiment includes: the first light source 20; the condensing lens 24; a fixing member 25 for fixing the condensing lens 24 by pressing it against the circuit substrate 33; the second light source 28; the heat sink 32 as a mounting component on which the first light source 20 and the second light source 28 are mounted; the rotating reflector 22; a support component 40 for supporting the rotating reflector 22; the convex lens 26 as a projection lens for projecting the light reflected by the rotating reflector 22 forward; the holder 31 for holding the convex lens 26 and the diffusion lens 30; a spacer 76; and a shade 68 for preventing sunlight from being incident on the surface of the blade 22a via the convex lens 26.

Figure 27A:
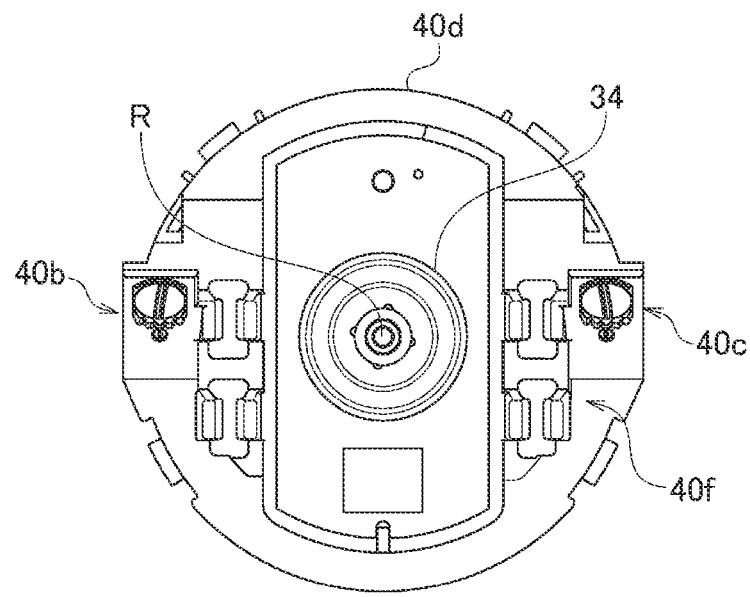
FIG. 27A is a rear view of the support component according to the embodiment.
Figure 27B:
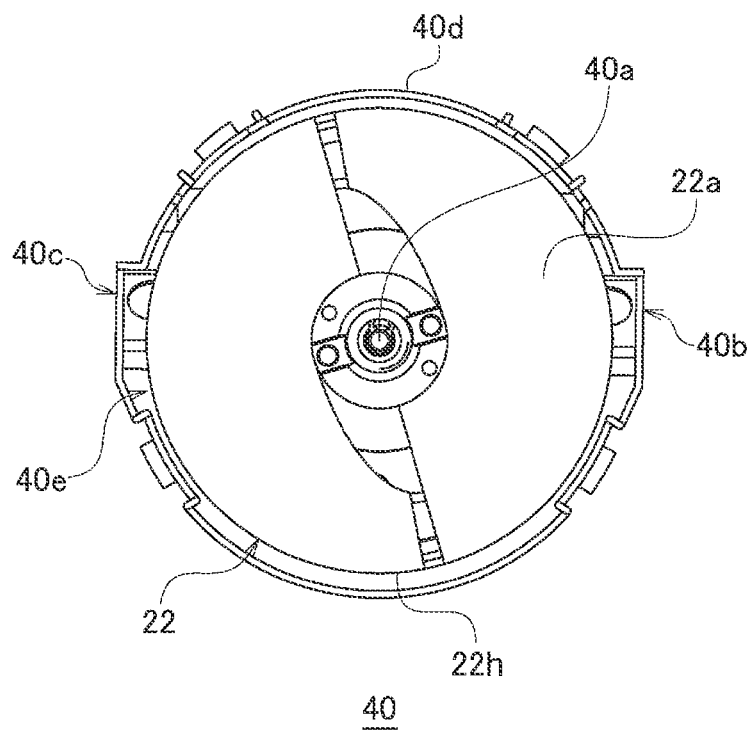
FIG. 27B is a front view of the support component according to the embodiment.
Figure 28A:
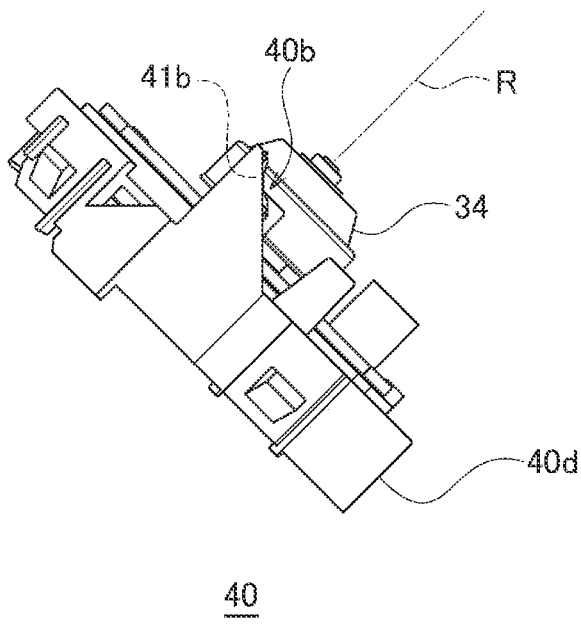
FIG. 28A is a side view of the support component shown in FIG. 25 as viewed in A direction.
Figure 28B:
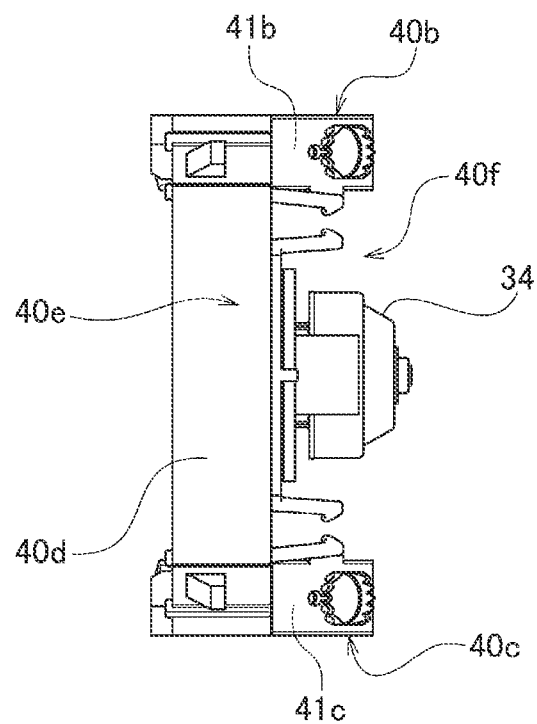
FIG. 28B is a side view of the support component shown in FIG. 26 as viewed in B direction.
Figure 29A:
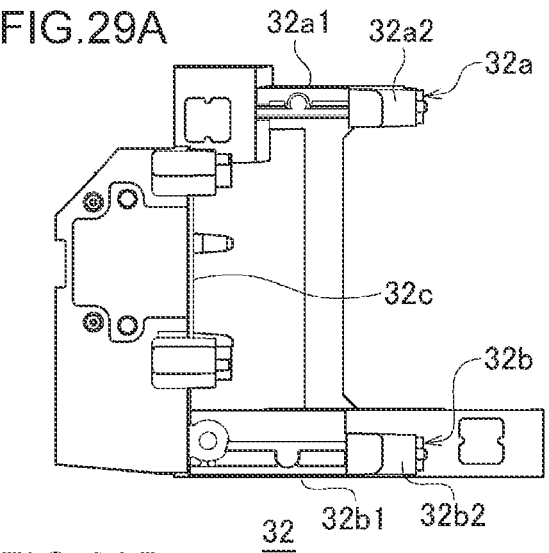
FIG. 29A is a side view of the heat sink shown in FIG. 25 as viewed in C direction.
Figure 29B:
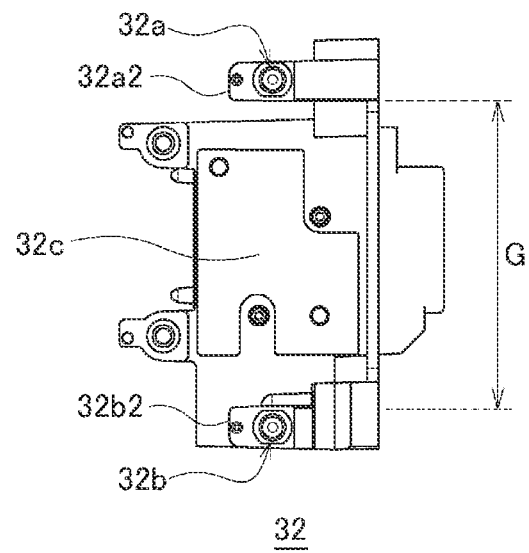
FIG. 29B is a front view of the heat sink shown in FIG. 25 as viewed in D direction.
Figure 29C:
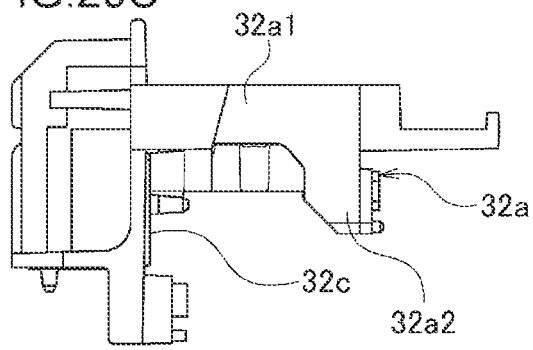
FIG. 29C is a top view shown in FIG. 25 as viewed in E direction.

FIG. 27A is a rear view of the support component according to the embodiment, and FIG. 27B is a front view of the support component according to the embodiment. FIG. 28A is a side view of the support component 40 shown in FIG. 25 as viewed in A direction, and FIG. 28B is a side view of the support component 40 shown in FIG. 26 as viewed in B direction. FIG. 29A is a side view of the heat sink 32 shown in FIG. 25 as viewed in C direction, FIG. 29B is a front view of the heat sink 32 shown in FIG. 25 as viewed in D direction, and FIG. 29C is a top view shown in FIG. 25 as viewed in E direction.

The support component 40 according to the embodiment has a support part 40a for rotatably supporting the rotating reflector 22 for reflecting the light emitted from the first light source 20, and fixing parts 40b, 40c fixed to the arm-shaped fixed parts 32a, 32b integrated with the heat sink 32 on which the first light source 20 is mounted. The fixing parts 40b, 40b have positioning surfaces 41b, 41c positioned with respect to the fixed parts 32a, 32b. The positioning surface 41b (41c) is, as shown in FIG. 28A, formed to be at an angle to the rotational axis R of the rotating reflector 22. More specifically, the angle formed by the rotational axis R and the positioning surfaces 41b, 41c is in a range 45°±5°.

The arm-shaped fixed part 32a has first fixed parts 32a1, 32b1 extending vertically with respect to a mounting surface 32c and second fixed parts 32a2, 32b2 extending from the ends thereof to bend forward with respect to the lamp. The second fixed parts 32a2, 32b2 are positioned and fixed with respect to the fixing parts 40b, 40c.

In the embodiment, the pair of arm-shaped fixed parts 32a, 32b (more specifically, the pair of first fixed parts 32a1, 32b1) are provided in the heat sink 32 at an interval (a vertical interval G in FIG. 29B) shorter than an outer edge part 22h of the rotating reflector 22. The second fixed parts 32a2, 32b2 extend forward with respect to the lamp so that at least a part of the fixing parts 40b, 40c can be provided in an area in the case 40d inward of the outer edge part 22h of the rotating reflector 22.

Further, the interval between the fixing parts 40b and 40c can be extended by extending the interval between the second fixed parts 32a2 and 32b2. Thus, in the case the rotational axis R and the fixing parts 40b, 40c are arranged on the same straight line, the support component 40 can support the parts with excellent weight balance because the heavy load (e.g., a motor 34) is provided in the neighborhood of the rotational axis.

According to the embodiment, the arm-shaped fixed parts 32a, 32b are configured as a pair. Alternatively, the end of each of a pair of the first fixed parts may branch into a plurality of (2, 3, 4, etc.) branches to support and fix the support component 40. By increasing the number of portions fixed, the support component 40, including the motor, can be fixed securely.

This allows, as shown in FIGS. 27A and 27B, at least a part of the fixing parts 40b, 40c to be provided inward of the outer edge part 22h of the rotating reflector 22 as viewed in the direction of the rotational axis R of the rotating reflector 22.

Further, the support part 40a of the support component 40 is provided between the fixing part 40b and the fixing part 40c. This arranges the support part 40a and the fixing parts 40b, 40c on a straight line so that the parts are arranged with excellent balance with respect to the gravitational center of the support component 40, and the vibration during the rotation of the rotating reflector 22 or the nose, etc. caused by the vibration are reduced.

Further, the support component 40 further includes a cylindrical case 40d in which the support part 40a is provided at the center. The fixing parts 40b, 40c are provided, as shown in FIG. 27 and FIG. 28, in an area 40f on the back side of the case opposite, across the case 40d, to a concave area 40e where the rotating reflector 22 is located. This allows at least a part of the fixing parts 40b, 40c to be provided on the back side of the case 40d as viewed in the direction of the rotational axis R of the rotating reflector 22.

Figure 30:
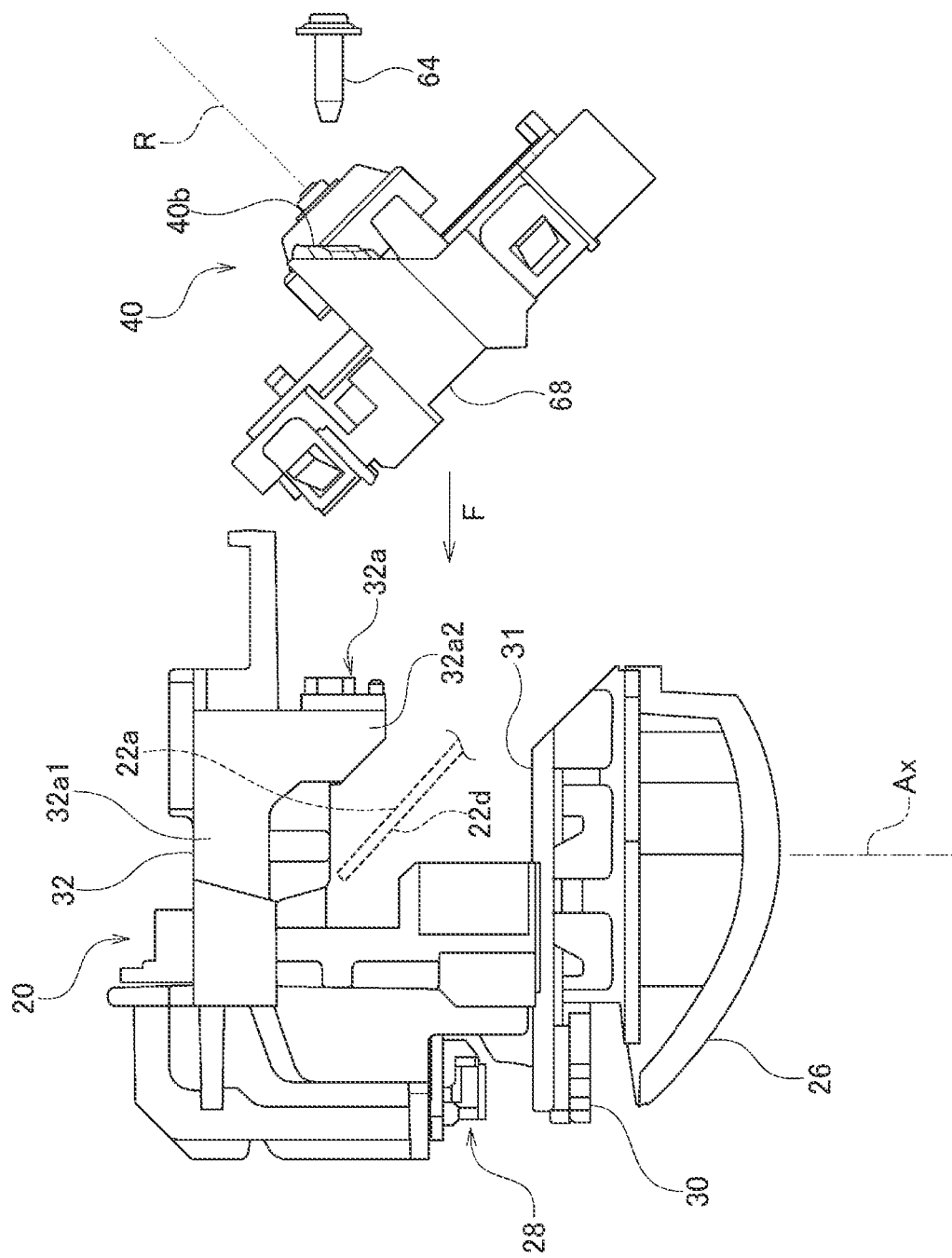
FIG. 30 is a top view for explaining how the support component according to the embodiment is fitted to the heat sink.

FIG. 30 is a top view for explaining how the support component according to the embodiment is fitted to the heat sink. As shown in FIG. 30, the support component 40 supporting the rotating reflector 22 is fitted in the direction of an arrow F to the heat sink 32, on which the first light source 20, the second light source 28, the holder 31, etc. are mounted. The fixing part 40b (40c) is caused to abut the fixed part 32a (32b). By fixing the support component 40 to the heat sink 32 with a screw 64 in this state, the support component 40 is fitted to the heat sink 32 at a predetermined position.

As shown in FIG. 30, the rotational axis R of the rotating reflector 22 is at an angle (more specifically, 45°±5° with respect to the light axis Ax of the convex lens 26. Thus, when the support component 40 is fitted to the heat sink 32, parts of the support component 40 (parts close to the heat sink 32) enter the space between the pair of arm-shaped fixed parts 32a, 32b of the heat sink 32, preventing the other parts (parts remote from the heat sink 32) of the support component 40 from interfering with the convex lens 26. This realizes a compact optical unit.

The heat sink 32 has, as shown in FIGS. 29A-29C, the mounting surface 32c on which the first light source 20 is mounted. Further, as shown in FIG. 30, the reflecting surface 22d of the rotating reflector 22 that reflects the light emitted from the first light source 20 is provided between the mounting surface 32c and the fixed part 32a at an angle to the light axis Ax of the convex lens 26.

Sixth Embodiment

The optical unit having the support component according to the embodiment can be used in a variety of vehicle lamps. (Method of Manufacturing the Entirety of Optical Unit)

A description will now be given of a method of manufacturing the entirety of the optical unit 18 mainly with reference to FIG. 25 and FIG. 26. The method of manufacturing an optical unit according to the embodiment is a method of manufacturing the optical unit 18 including: the first light source 20; the heat sink 32 on which the first light source 20 is mounted; the rotating reflector 22 for reflecting the light emitted from the first light source 20; the support component 40 for rotatably supporting the rotating reflector 22; the convex lens 26 for projecting the light reflected by the rotating reflector 22 forward; and the holder 31 for holding the convex lens 26.

Prior to manufacturing the entirety of the optical unit 18, the lens unit 29 and the reflecting unit 49 are fabricated. The lens unit 29 is manufactured by welding the holder 31 and the diffusion lens 30 while the holder 31 and the diffusion lens 30 are positioned such that, as shown in FIG. 25, a boss 31a formed in the frame of the holder 31 enters a boss hole 30b of the diffusion lens 30. This fixes the diffusion lens 30 at a predetermined position of the holder 31. The holder 31 and the convex lens 26 are then welded while the holder 31 and the convex lens 26 are positioned such that another boss 42b formed in the frame of the holder 31 enters a boss hole 26e and a notch 26f of the convex lens 26. In this way, the lens unit 29 in which the holder 31, the convex lens 26, and the diffusion lens 30 are integrated, is fabricated.

The holder 31, the convex lens 26, and the diffusion lens 30 according to the embodiment are all made of resin. In particular, the convex lens 26 and the diffusion lens 30 are made of transparent acrylic resin or polycarbonate resin.

Further, the reflecting unit 49 is manufactured by first fixing the rotating reflector 22 to the rotary shaft of the motor 34 provided in the support component 40. The shade 68 is then fixed to the support component 40 by causing the opening part of a protruding piece 68a, provided to protrude from the outer edge of the shade 68 toward the support component 40, to be caught by a pawl 40g formed on the outer circumferential part of the case 40d of the support component 40.

A description will now be given of a step of fixing the first light source 20, the lens unit 29, and the reflecting unit 49 to the heat sink 32.

First, the circuit substrate 33, the condensing lens 24, and the fixing member 25 are positioned with respect to and mounted on the heat sink 32 such that two bosses 32d provided on the mounting surface 32c of the heat sink 32 enter a boss hole 33b of the circuit substrate 33, a boss hole 24a of the condensing lens 24, and a boss hole 25a of the fixing member 25 (mounting step). In this state, the circuit substrate 33, the condensing lens 24, and the fixing member 25 are fixed to the heat sink 32 by tightening a screw 52. The second light source 28 may be fixed to another mounting surface 32e of the heat sink 32 at this stage by tightening a screw 53.

The lens unit 29 having the holder 31 that holds the convex lens 26 is fixed to the heat sink 32 by tightening a screw 54 (first fixing step). The reflecting unit 49 having the support component 40 that supports the rotating reflector 22 is then fixed to the heat sink 32 by tightening the screw 64 while the fixing parts 40b, 40c of the support component 40 are positioned with respect to the second fixed parts 32a2, 32b2 of the heat sink 32 (second fixing step).

This fixes the convex lens 26 to the heat sink 32, on which the first light source 20 is mounted, via the holder 31 so that it is easy to position the first light source 20 and the convex lens 26. Similarly, the rotating reflector 22 is fixed to the heat sink 32, on which the first light source 20 is mounted, via the support component 40 so that it is easy to position the first light source 20 and the rotating reflector 22. This does not require positioning when the components are fixed or after the components are fixed so that it is relatively easy to assemble the components.

In further accordance with the embodiment, a first fixing direction in which the holder 31 is fixed to the heat sink 32 in the first fixing step (direction along the arrow Y in FIG. 25 and FIG. 26) and a second fixing direction in which the support component 40 is fixed to the heat sink 32 in the second fixing step (direction along the arrow Y) are the same. In addition, the directions of tightening the screws are the same in the first fixing step and in the second fixing step. For example, this reduces the frequency at which the orientation of the jig is changed or the operator changes the posture in the first fixing step and the second fixing step.

In further accordance with the embodiment, the direction of mounting the first light source 20 on the heat sink 32 in the mounting step (direction along the arrow y in FIG. 25 and FIG. 26) and the first fixing direction are the same. In addition, the directions of tightening the screws are the same in the mounting step and the first fixing step. This reduces the frequency at which the orientation of the jig is changed or the operator changes the posture in the mounting step and the first fixing step.

In further accordance with the embodiment, the second fixing direction, in which the support component 40 that supports the rotating reflector 22 having the rotational axis R at an angle to the light axis Ax of the convex lens 26 is fixed to the heat sink 32, is ensured to be the same as the first step direction and the mounting direction. The positioning surface 41b (41c) according to the embodiment is a surface intersecting the second fixing direction (the angle formed is 45°). This improves the precision of positioning the first light source 20 and the rotating reflector 22.

The embodiments of the present invention are not limited to those described above and appropriate combinations or replacements of the features of the embodiments are also encompassed by the present invention. The embodiments may be modified by way of combinations, rearranging of the processing sequence, design changes, etc., based on the knowledge of a skilled person, and such modifications are also within the scope of the present invention.

Seventh Embodiment

The optical unit having the rotating reflector according to the embodiment can be used in a variety of vehicle lamps. An overview of a vehicle headlamp system in which the optical unit according to the embodiment described later will first be given.

(Vehicle Headlamp System)

Figure 31:
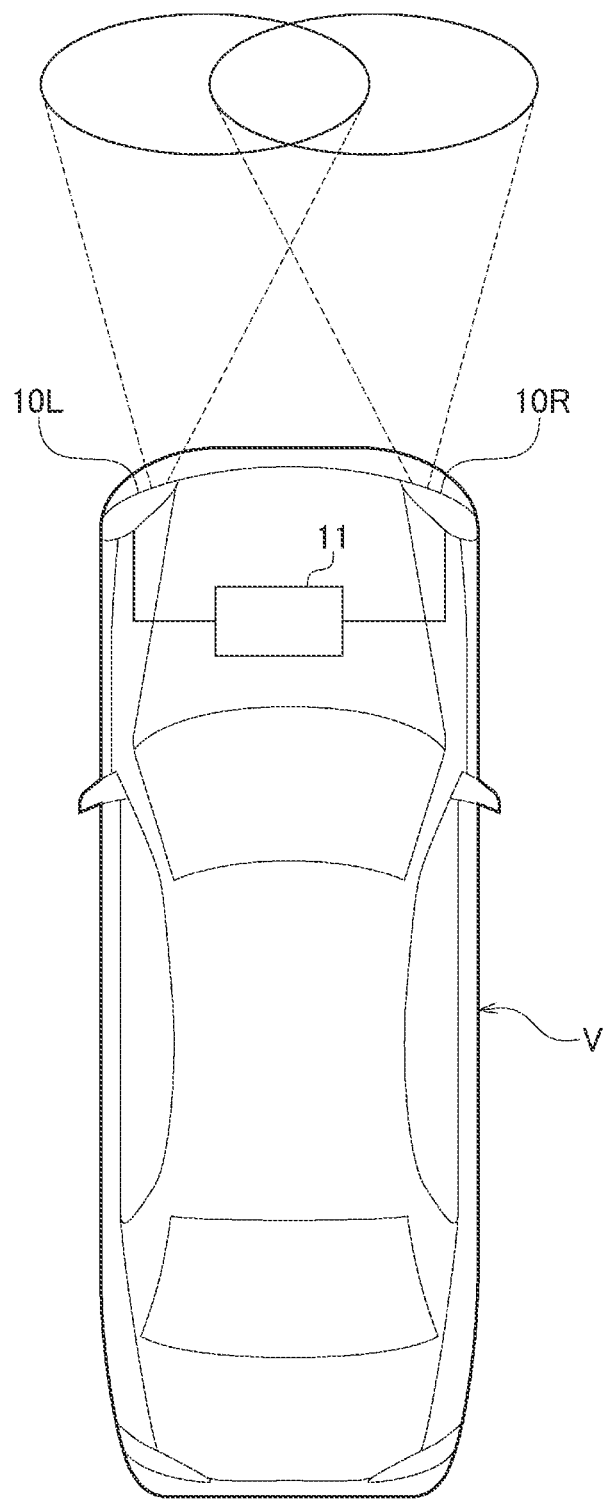
FIG. 31 is a perspective view showing the appearance of an automobile to which the vehicle headlamp system according to the embodiment is applied.

FIG. 31 is a perspective view showing the appearance of an automobile to which the vehicle headlamp system according to the embodiment is applied. A vehicle headlamp system 200 includes: a pair of vehicle headlamps 10R, 10L (hereinafter, referred to as "vehicle headlamp 10" as appropriate) provided on the right corner and the left corner of the front part of an automobile V; and a control unit 11 for controlling the vehicle headlamps 10R, 10L to be turned on or off. The control unit 11 controls the vehicle headlamps 10R, 10L in accordance with the distance to or the position of the vehicle in front traveling in front of the driver's vehicle, based on a signal transmitted from various sensors provided in the vehicle (vehicle speed sensor, imaging camera, radar apparatus, optical sensor, GPS apparatus, etc.).

(Optical Unit)

Figure 32:
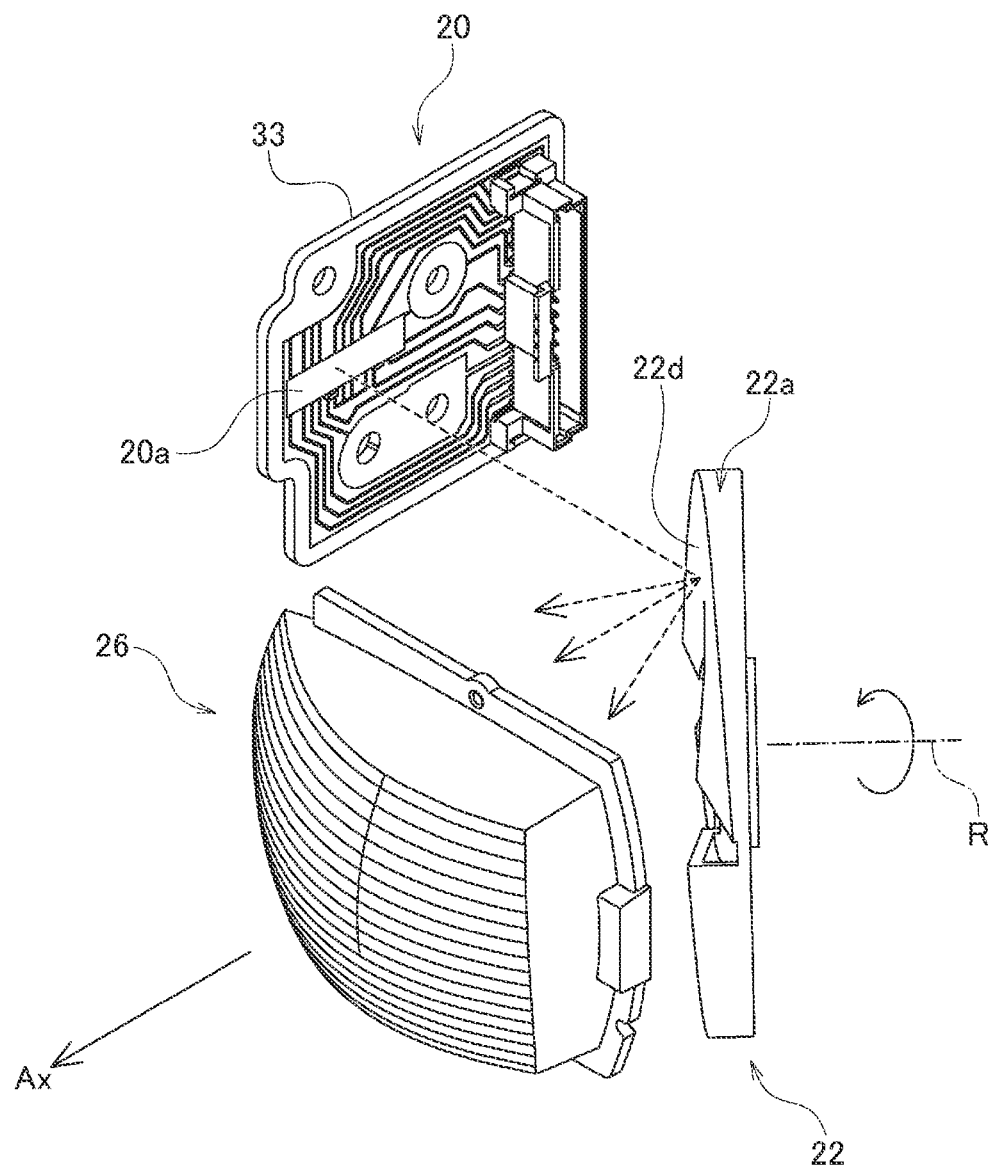
FIG. 32 is a perspective view showing an important part of the optical unit according to the embodiment.

FIG. 32 is a perspective view showing an important part of the optical unit according to the embodiment. Of the components forming the optical unit 18, FIG. 32 mainly shows the first light source 20, the rotating reflector 22, and the convex lens 26, and illustration of some of the components is omitted for convenience of explanation.

As shown in FIG. 32, the optical unit 18 includes: the first light source 20 comprised of the plurality of LEDs 20a arrayed in a line in the horizontal direction; and the convex lens 26 for projecting the light emitted from the first light source 20 and reflected by the rotating reflector 22 in the direction of light irradiation of the optical unit (light axis Ax). The rotating reflector 22 is arranged such that the rotational axis R extends at an angle to the direction of light irradiation (light axis Ax) and in the horizontal direction.

Further, the first light source 20 is arranged such that the light emission surface of each of the plurality of LEDs 20a is at an angle to the reflecting surface.

The reflecting surface 22d of the blade 22a is shaped such that angle formed by the light axis Ax and the reflecting surface varies toward the circumference around the rotational axis R. The detailed shape of the reflecting surface will be described below.

(Rotating Reflector)

The rotating reflector 22 shown in FIGS. 3 through 6 are used in the vehicle headlamp 10 for the right headlamp and is rotated counterclockwise in the front view of the reflecting surface 22d. Further, the reflecting surface 22d of the blade 22a is configured, as shown in FIGS. 3 through 6, such that the height of the outer circumferential part in the axial direction (direction of thickness of the blade) is progressively larger in the counterclockwise direction in the front view. Conversely, the reflecting surface 22d is configured such that the height of the inner circumferential part closer to the rotating part 22b in the axial direction is progressively smaller in the counterclockwise direction.

Further, the reflecting surface 22d is configured to be progressively higher from an end 22e of the outer circumferential part having a smaller axial height toward the center (rotating part 22b). Conversely, the reflecting surface 22d is configured to be progressively lower from an end 22f of the outer circumferential part having a larger axial height toward the center.

Figure 33A:
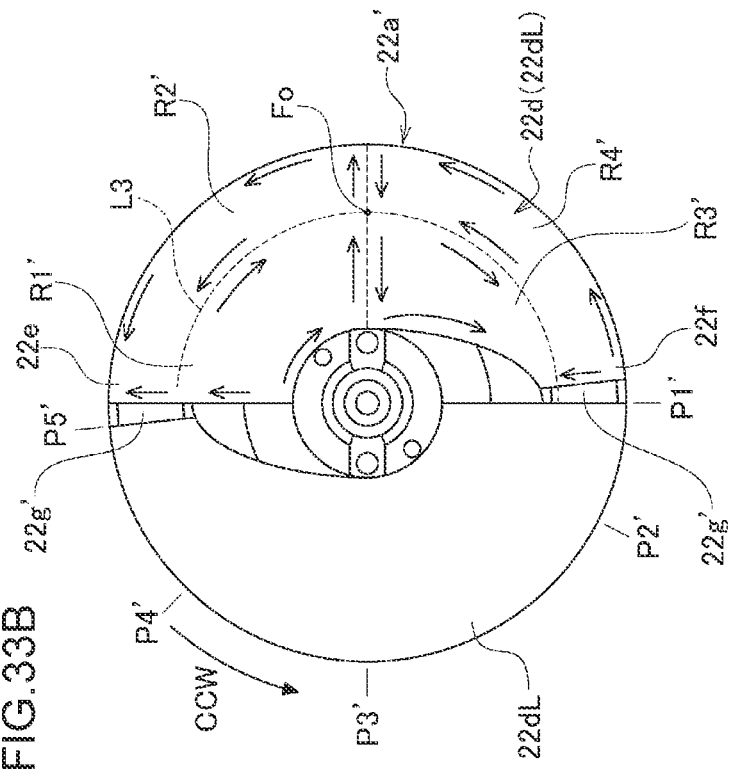
FIG. 33A is a front view of the rotating reflector for the right headlamp for explaining the shape of the reflecting surface.
Figure 33B:
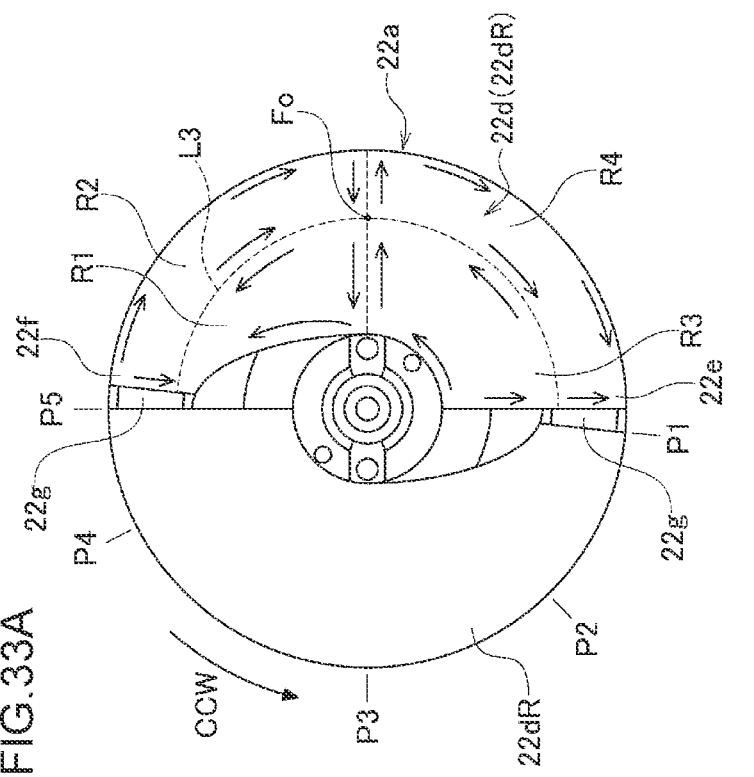
FIG. 33B is a front view of the rotating reflector for the left headlamp for explaining the shape of the reflecting surface.

A description will be given of a normal vector of the reflecting surface 22d inclined differently depending on the part. FIG. 33A is a front view of the rotating reflector for the right headlamp for explaining the shape of the reflecting surface, and FIG. 33B is a front view of the rotating reflector for the left headlamp for explaining the shape of the reflecting surface. A rotating reflector 22R for the right headlamp shown in FIG. 33A and a rotating reflector 22L for the left headlamp shown in FIG. 33B are related such that the surface shapes of the respective reflective surfaces are mirror images of one another.

A dotted line L3 shown in FIG. 33A connects portions of the reflecting surface 22d having substantially the same axial height, and only the normal vector of the reflecting surface 22d at a point FO on the dotted line L3 is parallel to the rotational axis of the rotating reflector 22R.

Each arrow shown in FIG. 33a and FIG. 33b indicates the direction of inclination in that area, and the arrow is drawn to be oriented from high to low portions on the reflecting surface 22d. As shown in FIG. 33A and FIG. 33B, the reflecting surface 22d according to the embodiment is such that the directions of inclination in the circumferential direction or the radial direction are opposite in the neighboring areas across the dotted line 3.

For example, the light incident on an area R1 from an area directly facing the reflecting surface 22d of the rotating reflector 22R shown in FIG. 33A is reflected diagonally leftward and upward in the state shown in FIG. 33A. Similarly, the light incident on an area R2 is reflected diagonally leftward and downward, the light incident on an area R3 is reflected diagonally rightward and upward, and the light incident on an area R4 is reflected diagonally rightward and downward.

The light incident on an area R1' from an area directly facing the reflecting surface 22d of the rotating reflector 22L shown in FIG. 33B is reflected diagonally rightward and downward in the state shown in FIG. 33B. Similarly, the light incident on an area R2' is reflected diagonally rightward and upward, the light incident on an area R3' is reflected diagonally leftward and downward, and the light incident on an area R4' is reflected diagonally leftward and upward.

Thus, the reflecting surface 22d of the rotating reflector 22 (22R, 22L) is configured such that the direction of reflection of the incident light varies depending on the area. Therefore, the direction of reflection of the incident light varies periodically by rotating the rotating reflector 22. By taking advantage of this feature, the rotating reflector 22 scans an area in front with the reflected light, rotating the light emitted from the first light source 20, thereby forming a light distribution pattern.

Figure 34A:
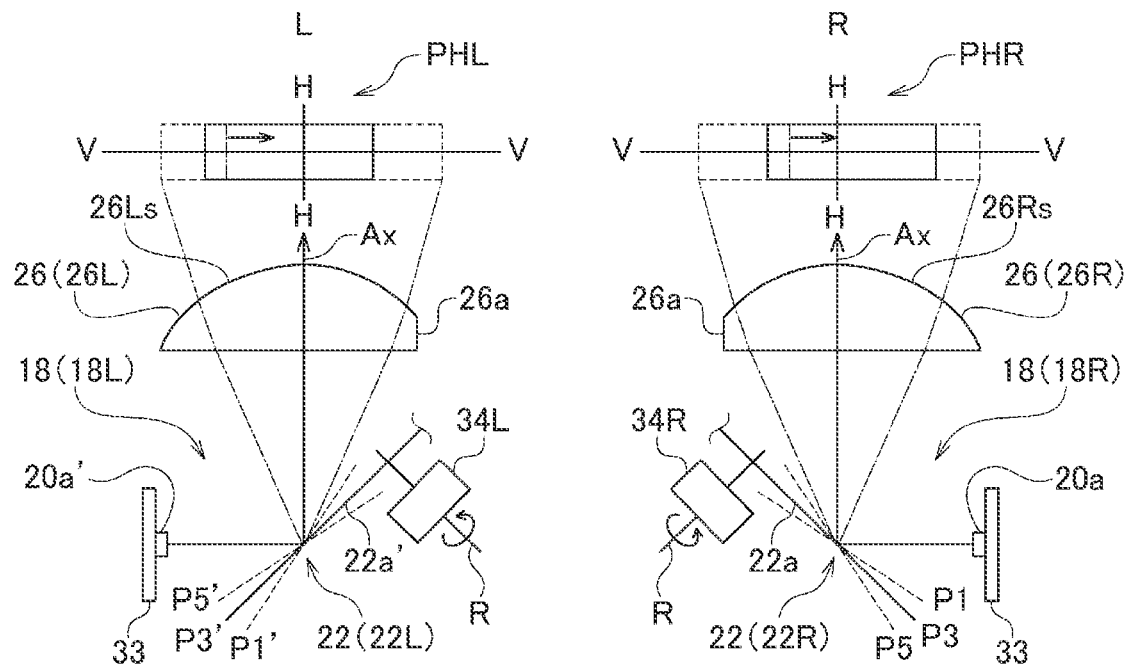
FIG. 34A is a schematic diagram for explaining the relationship between the layout of the left and right optical units and the light distribution patterns formed by the respective optical units.
Figure 34B:
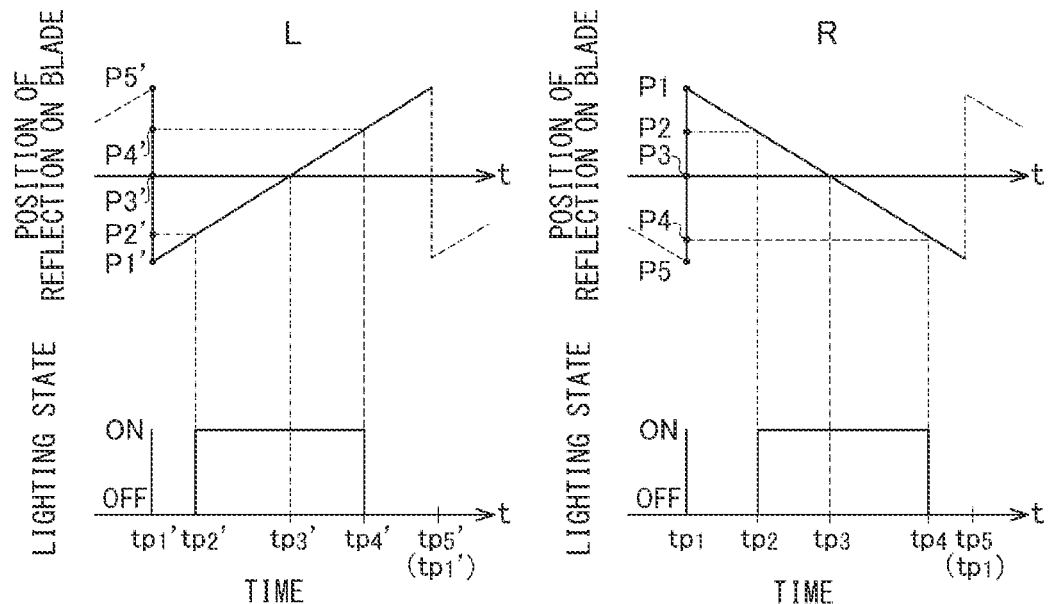
FIG. 34B is a diagram for explaining the positions during rotation of the blades of the left and right rotating reflectors and the timing for turning the LEDs of the left and right light sources on or off.

A description will now be given of formation of a light distribution pattern by the vehicle headlamp system 200 according to the embodiment. FIG. 34A is a schematic diagram for explaining the relationship between the layout of the left and right optical units and the light distribution patterns formed by the respective optical units, and FIG. 34B is a diagram for explaining the positions during rotation of the blades in the left and right rotating reflectors and the timing for turning the LEDs of the left and right light sources on or off.

A description will first be given of a light distribution pattern PHR formed by an optical unit 18R provided in the right vehicle headlamp 10R. The optical unit 18R provided front right in the vehicle has the LED 20a, the rotating reflector 22R rotated around the rotational axis R while reflecting the light emitted from the LED 20a, and a motor 34R for rotating the rotating reflector 22R in the counterclockwise direction (CCW) shown in FIG. 33A. Similarly, the optical unit 18L provided front left in the vehicle has an LED 20a', the rotating reflector 22L rotated around the rotational axis R while reflecting the light emitted from the LED 20a', and a motor 34L for rotating the rotating reflector 22L in the counterclockwise direction (CCW) shown in FIG. 33A.

The rotating reflector 22R has a reflecting surface 22dR configured to form the desired light distribution pattern PHR by causing the light of the LEDa reflected during rotation to scan an area in front of the vehicle. As shown in FIG. 34B, the LED 20a is turned off at a point of time $t_{P1}$ when a blade position P1 of the reflecting surface 22dR arrives at a position directly facing the light emission surface of the LED 20a. The LED 20a is turned on (ON) at a point of time $t_{P2}$ when a blade position P2 of the reflecting surface 22dR arrives at a position directly facing the light emission surface of the LED 20a. As a result, the area including the left end of the light distribution pattern PHR is irradiated.

Thereafter, a blade position P3 passes through a position directly facing the light emission surface while the LED 20a is being turned on (a point of time $t_{P3}$). At a point of time $t_{P4}$ when a blade position P4 arrives, the LED 20a is turned off (OFF). Thus, as a result of the blade positions P2-P4 passing through the position directly facing the light emission surface of the LED 20a that is lighted, the light reflected by the blade 22a scans an area in front of the vehicle from left to right in FIG. 34A to form the light distribution pattern PHR. Thereafter, at a point of time $t_{P5}$ ($\approx t_{p1}$), the blade position P1 of the adjacent blade 22a arrives at a position directly facing the light emission surface of the LED 20a, completing one cycle. The rotating reflector 22R according to the embodiment has two blades 22a and so completes one turn by performing the aforementioned scan in two cycles.

Further, like the rotating reflector 22R, the rotating reflector 22L has a reflecting surface 22dL configured to form a desired light distribution pattern PHL by causing the light of the LED 20a' reflected during rotation to scan an area in front of the vehicle. As shown in FIG. 34B, the LED 20a' is turned off at a point of time $t_{P1'}$ when a blade position P1' of the reflecting surface 22dL arrives at a position directly facing the light emission surface of the LED 20a'. The LED 20a' is turned on (ON) at a point of time $t_{P2'}$ when a blade position P2' of the reflecting surface 22dL arrives at a position directly facing the light emission surface of the LED 20a'. As a result, the area including the left end of the light distribution pattern PHL is irradiated.

Thereafter, a blade position P3' passes through a position directly facing the light emission surface while the LED 20a' is being turned on (a point of time $t_{P3'}$). At a point of time $t_{P4'}$ when a blade position P4' arrives, the LED 20a' is turned off (OFF). Thus, as a result of the blade positions P2'-P4' passing through the position directly facing the light emission surface of the LED 20a' that is lighted, the light reflected by the blade 22a' scans an area in front of the vehicle from left to right in FIG. 34A to form the light distribution pattern PHL. Thereafter, at a point of time $t_{P5'}$ ($\approx t_{p1'}$), the blade position P1' of the adjacent blade 22a' arrives at a position directly facing the light emission surface of the LED 20a', completing one cycle. The rotating reflector 22L according to the embodiment has two blades 22a' and so completes one turn by performing the aforementioned scan in two cycles.

The reflecting surface 22dR and the reflecting surface 22dL are arranged, as shown in FIG. 34A, to be horizontally symmetrical with respect to the center of the vehicle. Further, the reflecting surface 22dR and the reflecting surface 22dL are related such that, as shown in FIG. 33A and FIG. 33B, the surface shapes thereof are mirror images of one another.

As described above, since the directions of rotation of the rotating reflector 22R and the rotating reflector 22L are the same (counterclockwise direction in FIG. 33A and FIG. 33B), a common unit may be used for the motors 34R, 34L. This makes it unnecessary to prepare the motors 34R, 34L having different specifications (e.g., having different directions of motor rotation) and the motors can be controlled and driven commonly.

Further, the optical unit 18R also has a convex lens 26R (26) for projecting the light reflected by the rotating reflector 22R forward with respect to the vehicle. Further, the optical unit 18L also has a convex lens 26L (26) for projecting the light reflected by the rotating reflector 22L forward with respect to the vehicle. As shown in FIG. 34A, an output surface 26Rs, as a first optical surface of the convex lens 26R that transmits the light reflected by the rotating reflector 22R, is horizontally asymmetrical with respect to the light axis Ax. Similarly, an output surface 26Ls, as a second optical surface of the convex lens 26L that transmits the light reflected by the rotating reflector 22L, is horizontally asymmetrical with respect to the light axis Ax. The output surfaces 26Rs, 26Ls are related such that, as shown in FIG. 34A, the surface shapes thereof are mirror images of one another.

The convex lens 26R is provided front right in the vehicle, and the convex lens 26L is provided front left in the vehicle. Therefore, the optical design of the convex lens 26L may merely be a horizontally inverted version of the optical design of the convex lens 26R.

The rotating reflector 22R has a plurality of blades 22a (first blades) as first reflecting surfaces, and the rotating reflector 22L has a plurality of blades 22a' (second blades) as second reflecting surfaces. The control unit 11 according to the embodiment controls the LED 20a to be turned on or off so that the light emitted from the LED 20a of the optical unit 18R is not incident on the plurality of blades 22a at the same time and controls the LED 20a' to be turned on or off so that the light emitted from the LED 20a' of the optical unit 18L is not incident on the plurality of blades 22a' at the same time.

For example, this inhibits the reflected light from the plurality of blades 22a from scanning distant locations in front of the vehicle at the same time and inhibits the reflected light from the plurality of blades 22a' from scanning distant locations in front of the vehicle at the same time, by turning off the LEDs 20a, 20a' provided in the left and right optical units 18R, 18L at predetermined points of time.

A through hole 22g is formed between the adjacent blades 22a of the rotating reflector 22R so that the light emitted from the LED 20a is not incident on the plurality of blades 22a at the same time. A through hole 22g' is formed between the adjacent blades 22a' of the rotating reflector 22L so that the light emitted from the LED 20a' is not incident on the plurality of blades 22a' at the same time. This inhibits the reflected light from the plurality of blades 22a from scanning distant locations in front of the vehicle at the same time and inhibits the reflected light from the plurality of blades 22a' from scanning distant locations in front of the vehicle at the same time, without turning off the LEDs 20a, 20a' for a long period of time.

Further, the control unit 11 according to the embodiment can, as shown in FIG. 34B, shift the point of time $t_{P4'}$ when the LED 20a' is turned off with respect to the point of time $t_{P4}$ when the LED 20a is turned off. The reflecting surface 22dR of the rotating reflector 22R and the reflecting surface 22dL of the rotating reflector 22L are rotated in the same direction. Further, the reflecting surface 22dR and the reflecting surface 22dL are arranged to be horizontally symmetrical with respect to the central line extending in the longitudinal direction of the vehicle and are related such that the surface shapes of the reflecting surfaces are mirror images of one another.

If the timing for turning off the LED 20a is aligned with the timing for turning on or off the LED 20a', therefore, the light distribution pattern PHR formed by the rotating reflector 22R will match the light distribution pattern formed by the rotating reflector 22L. In this case, the light distribution patterns PHR, PHL will not be horizontally symmetrical, and the light distribution pattern produced by overlapping the light distribution patterns PHR, PHL will distribute light disproportionately leftward or rightward across a V-V line at the center. Therefore, an overall horizontally symmetrical light distribution pattern can be formed by shifting the timing for turning the LEDs 20a, 20a' on or off.

The points of time may be scheduled to meet:

$$t_{P1}(t_{P5}=t_{P1'}(t_{P5'})$$

$$t_{P2}-t_{P1}>t_{P2'}-t_{P1'}$$

$$t_{P5}-t_{P4}<t_{P5'}-t_{41'}$$

or $$t_{P1}(t_{P5})=t_{P1'}(t_{P5'})$$

$$t_{P2}-t_{P1}<t_{P2'}-t_{P1'}$$

$$t_{P5}-t_{P4}>t_{P5'}-t_{41'}$$

Further, the direction in which the light of the LED 20a reflected by the rotating reflector 22R during rotation scans an area in front of the vehicle (direction from left to right in FIG. 34A) and the direction in which the light of the LED 20a' reflected by the rotating reflector 22L during rotation scans an area in front of the vehicle are the same (direction from left to right in FIG. 34A). This forms a light distribution pattern that that the driver does not feel uncomfortable.

The present invention has been described with reference to the embodiments but is not limited to the embodiments described above. Appropriate combinations or replacements of the features of the illustrated examples are also encompassed by the present invention. The embodiments may be modified by way of combinations, rearranging of the processing sequence, design changes, etc., based on the knowledge of a skilled person, and such modifications are also within the scope of the present invention.

In the embodiments described above, the rotating reflector 22 having the blade 22a is used. Alternatively, a polygon mirror may be used instead of the rotating reflector 22. Still alternatively, an MEMS mirror (resonant mirror) may be used instead of the rotating reflector 22. Still alternatively, a digital micromirror device (DMD), in which a large number of movable minute mirror surfaces (micromirrors) are arranged in a matrix, may be used instead of the rotating reflector 22.

Further, the first light source 20 according to the embodiments includes five LEDs 20a arranged on a line, but the light source may be comprised of a large number of light emitting devices arranged in an array or a matrix.

APPENDIX

It is to be noted that Embodiments described above may be expressed by the items described hereinafter.

Item 1. A lens unit comprising:
a first lens provided on an emission side;
a second lens provided on an incidence side; and
a holder that holds the first lens and the second lens, wherein
the first lens overlaps the second lens in part as viewed from the emission side.

Item 2. The lens unit according to item 1, wherein the holder includes:
a first mounting part on which the first lens is mounted; and
a second mounting part on which the second lens is mounted, wherein
the first mounting part is formed more toward the emission side than the second mounting part.

Item 3. The lens unit according to item 2, wherein
the holder is a cylindrical member that transmits light inside, and the first mounting part and the second mounting part are formed on one end surface of the holder.

Item 4. The lens unit according to item 1, wherein
the first lens includes:
a first area that transmits light emitted from a first light source; and
a second area that transmits light emitted from a second light source and transmitted by the second lens.

Item 5. An optical unit comprising:
a first light source;
a second light source;
the lens unit according to item 4; and
a rotating reflector that reflects light emitted from the first light source toward the first area with a rotating reflecting surface.

Item 6. An optical member comprising: an optical controller that controls light incident from a back side and outputs the light from a front side; and a base part adjacent to the optical controller, wherein
the optical controller has a plurality of lens parts respectively corresponding to light emitted from a plurality of light emitting devices, and
the base part has a scattering part that scatters at least a portion of the light incident from the back side or the light output from the front side.

Item 7. The optical member according to item 6, wherein
a surface of the scattering part has an arithmetic mean roughness of 0.3 µm or larger.

Item 8. The optical member according to item 6, wherein
the lens parts are shaped to condense light by refracting transmitted light.

Item 9. The optical member according to item 6, wherein
the optical member is an injection molded product entirely made of silicone.

Item 10. The optical member according to item 6, wherein
the base part is plate-shaped and has thick parts having a thickness larger than a thickness around the optical controller, and the thick parts are formed in a periphery of the base part.

Item 11. A vehicle headlamp comprising:
a light source having a plurality of light emitting devices;
the optical member according to item 6 that controls light distribution of light emitted respectively from the plurality of light emitting devices; and
a projection lens that projects the light for which light distribution is controlled by the optical member forward with respect to a vehicle.

Item 12. A linking structure comprising:
a heat sink;
a circuit substrate mounted on the heat sink and formed with a power feeding channel for a light source;
a first connector fixed on the circuit substrate; and
a guide part that guides a second connector toward the first connector when the second connector on the side of a code is connected to the first connector, wherein
the guide part is configured such that a part of the second connector enters an area between the guide part and the first connector.

Item 13. The linking structure according to item 12, wherein
the guide part is formed with guide grooves that guide the part of the second connector in a warped state when the second connector is connected to the first connector.

Item 14. The linking structure according to item 13, wherein
the guide part has an engaging part with which the part of the second connector guided by the guide grooves is engaged while the second connector is fitted in the first connector.

Item 15. The linking structure according to item 12, wherein
the first connector is arranged such that a connection part faces upward with respect to a substrate surface of the circuit substrate, and
the guide part is provided at a position above and distanced from the connection part.

Item 16. The linking structure according to item 12, wherein
the guide part is fixed to the heat sink.

Item 17. A method of manufacturing an optical unit, the optical unit including:
a light source;
a mounting component on which the light source is mounted;
a rotating reflector that reflects light emitted from the light source;
a support component that rotatably supports the rotating reflector;
a projection lens that projects reflected light reflected by the rotating reflector forward; and a lens holder that holds the projection lens, the method comprising:
mounting the light source on the mounting component;
after the mounting, fixing the lens holder supporting the projection lens to the mounting component; and
after the fixing of the lens holder, fixing the support component supporting the rotating reflector to the mounting component.

Item 18. The method of manufacturing an optical unit according to item 17, wherein a first direction in which the lens holder is fixed to the mounting component and a second fixing direction in which the support component is fixed to the mounting component are the same.

Item 19. The method of manufacturing an optical unit according to item 18, wherein a direction in which the light source is mounted on the mounting component and the first fixing direction are the same.

Item 20. The method of manufacturing an optical unit according to item 18, wherein
the support component includes:
a support part that rotatably supports the rotating reflector for reflecting light emitted from a light source; and
fixing parts fixed to fixed parts integrated with a mounting component on which the light source is mounted, wherein
a rotational axis of the rotating reflector is at an angle to the second fixing direction.

Item 21. The method of manufacturing an optical unit according to item 20, wherein
the fixing parts have positioning surfaces positioned with respect to the fixed parts, and
the positioning surfaces are surfaces intersecting the second fixing direction.

What is claimed is:

1. A method of manufacturing a rotating reflector including a rotating part and a blade provided around the rotating part and functioning as a reflecting surface, the method comprising:
performing injection molding by using a mold in which a gate is formed more toward the rotating part than a cavity part corresponding to the blade.

2. The method of manufacturing the rotating reflector according to claim 1, wherein
the gate is provided on the same side as the reflecting surface of the blade.

3. The method of manufacturing the rotating reflector according to claim 1, wherein
the gate is formed at a position that faces the rotating part.

4. The method of manufacturing the rotating reflector according to claim 1, wherein
the number of gates formed is the same as the number of blades.

5. The method of manufacturing the rotating reflector according to claim 1, wherein
a mount which forms a part of the rotating part and on which is mounted a non-resin component, in which a rotary shaft is inserted, is formed in the neighborhood of the gate of the mold.

6. A resin rotating reflector comprising:
a rotating part; and
a blade provided around the rotating part and functioning as a reflecting surface, wherein
the rotating part has a hole in which a rotary shaft is inserted,
a plurality of traces of gates are formed between the hole and the blade, and welds, in which molten resin injected from a plurality of gates converge, are formed around the hole and in the neighborhood of the traces of gates.

7. A support component comprising:
a motor that rotatably supports a rotating reflector for reflecting light emitted from a light source;
a case in which the motor is provided; and
a fixing portion provided on the case and fixed to a fixed portion integrated with a mounting component on which the light source is mounted, wherein
the fixing portion has a first fixing portion and a second fixing portion, and
a rotational axis of the rotating reflector is positioned between a first region where the first fixing portion contacts with the fixed portion and a second region where the second fixing portion contacts with the fixed portion, when viewed in a direction of the rotational axis.

8. The support component according to claim 7, wherein
the motor is provided at a center of the case, when viewed in the direction of the rotational axis, wherein
the fixing portion is provided in an area on a back side of the case opposite, across the case, to an area where the rotating reflector is located.

9. An optical unit comprising:
a light source;
a mounting component on which the light source is mounted;
the support component according to claim 7;
a rotating reflector supported by the support component; and
a projection lens that projects light reflected by the rotating reflector forward, wherein
a rotational axis of the rotating reflector is at an angle to a light axis of the projection lens.

10. The optical unit according to claim 9, wherein
the mounting component includes:
a mounting surface on which the light source is mounted; and
a fixed portion provided in an area distanced from the mounting surface, the fixing portion being fixed to the fixed portion,
a reflecting surface of the rotating reflector that reflects light emitted from the light source is provided between the mounting surface and the fixed portion at an angle to the light axis of the projection lens.

11. The support component according to claim 7, wherein
the rotational axis, the first region and the second region are positioned on the same straight line respectively, viewed in the direction of the rotational axis.

12. A vehicle headlamp system comprising:
a first optical unit provided front right in a vehicle; and
a second optical unit provided front left in a vehicle, wherein
the first optical unit includes:
a first light source;
a first rotating reflector rotated around a rotational axis while reflecting light emitted from the first light source; and
a first motor that rotates the first rotating reflector in a predetermined one direction,
the second optical unit includes:
a second light source;
a second rotating reflector rotated around a rotational axis while reflecting light emitted from the second light source; and a second motor that rotates the second rotating reflector in the same predetermined one direction as a direction of rotation of the first rotating reflector, the first rotating reflector has a first reflecting surface configured to form a desired light distribution pattern by causing the light of the first light source reflected during rotation to scan an area in front of the vehicle, the second rotating reflector has a second reflecting surface configured to form a desired light distribution pattern by causing the light of the second light source reflected during rotation to scan an area in front of the vehicle, and the first reflecting surface and the second reflecting surface are arranged to be horizontally symmetrical with respect to the center of the vehicle, and surface shapes of the first and second reflecting surfaces are mirror images of one another.

13. The vehicle headlamp system according to claim 12, wherein the first optical unit further has a first projection lens that projects the light reflected by the first rotating reflector forward with respect to the vehicle, the second optical unit further has a second projection lens that projects the light reflected by the second rotating reflector forward with respect to the vehicle, a first optical surface of the first projection lens transmitting the light reflected by the first rotating reflector is horizontally asymmetrical with respect to a light axis, a second optical surface of the second projection lens transmitting the light reflected by the second rotating reflector is horizontally asymmetrical with respect to a light axis, and the first optical surface and the second optical surface are related such that surface shapes of the first and second optical surfaces are mirror images of one another.

14. The vehicle headlamp system according to claim 12, wherein the first rotating reflector has a plurality of first blades as first reflecting surfaces, and the second rotating reflector has a plurality of second blades as second reflecting surfaces, the vehicle headlamp further comprising:

a control unit that controls the first light source to be turned on or off so that the light emitted from the first light source is not incident on the plurality of first blades at the same time and controls the second light source to be turned on or off so that the light emitted from the second light source is not incident on the plurality of second blades at the same time.

15. The vehicle headlamp system according to claim 14, wherein a through hole is formed between the adjacent first blades of the first rotating reflector so that the light emitted from the first light source is not incident on the plurality of first blades at the same time, and a through hole is formed between the adjacent second blades of the second rotating reflector so that the light emitted from the second light source is not incident on the plurality of second blades at the same time.

16. The vehicle headlamp system according to claim 14, wherein the control unit shifts a point of time when the second light source is turned off with respect to a point of time when the first light source is turned off.

17. The vehicle headlamp system according to claim 12, wherein a direction in which the light of the first light source reflected by the first rotating reflector during rotation scans an area in front of the vehicle and a direction in which the light of the second light source reflected by the second rotating reflector during rotation scans an area in front of the vehicle are the same.

* * * * *